(12) United States Patent
Watanabe et al.

(10) Patent No.: US 10,951,308 B2
(45) Date of Patent: Mar. 16, 2021

(54) APPARATUS FOR CONVERSION BETWEEN WIRELESS SIGNALS AND SPATIAL LIGHT COMMUNICATION SIGNALS

(71) Applicant: NEC Corporation, Tokyo (JP)

(72) Inventors: Go Watanabe, Tokyo (JP); Satoshi Kyosuna, Tokyo (JP)

(73) Assignee: NEC CORPORATION, Tokyo (JP)

( * ) Notice: Subject to any disclaimer, the term of this patent is extended or adjusted under 35 U.S.C. 154(b) by 239 days.

(21) Appl. No.: 16/086,073

(22) PCT Filed: Mar. 17, 2017

(86) PCT No.: PCT/JP2017/010960
§ 371 (c)(1),
(2) Date: Sep. 18, 2018

(87) PCT Pub. No.: WO2017/169913
PCT Pub. Date: Oct. 5, 2017

(65) Prior Publication Data
US 2020/0295827 A1 Sep. 17, 2020

(30) Foreign Application Priority Data
Mar. 29, 2016 (JP) .............................. JP2016-065877

(51) Int. Cl.
*H04B 10/114* (2013.01)
*H04B 10/112* (2013.01)
(Continued)

(52) U.S. Cl.
CPC ......... *H04B 10/114* (2013.01); *H04B 10/112* (2013.01); *H04B 10/40* (2013.01); *H04B 10/548* (2013.01); *H04B 10/29* (2013.01)

(58) Field of Classification Search
CPC .................. H04B 10/11–118; H04B 10/29; H04B 10/40; H04B 10/548
(Continued)

(56) References Cited

U.S. PATENT DOCUMENTS

| 2008/0013558 A1 | 1/2008 | Ito et al. |
| 2008/0056723 A1* | 3/2008 | Giles .................... H04B 10/118 398/118 |

(Continued)

FOREIGN PATENT DOCUMENTS

| JP | H08-65031 A | 3/1996 |
| JP | 2007-043611 A | 2/2007 |

(Continued)

OTHER PUBLICATIONS

International Search Report for PCT Application No. PCT/JP2017/010960, dated Jun. 20, 2017.

(Continued)

*Primary Examiner* — Casey L Kretzer

(57) ABSTRACT

In order to reduce wire connections and achieve a wireless communication environment securing a sufficient communication band, the present invention provides a communication apparatus that includes a wireless communication means for transmitting and receiving a wireless signal, an optical communication means for transmitting and receiving spatial light as communication light, and a control means for performing signal conversion in a process for converting the wireless signal and the communication light and setting a transmission destination of the wireless signal and the communication light.

13 Claims, 27 Drawing Sheets

(51) Int. Cl.
*H04B 10/40* (2013.01)
*H04B 10/548* (2013.01)
*H04B 10/29* (2013.01)

(58) Field of Classification Search
USPC .................................................. 398/115–117
See application file for complete search history.

(56) References Cited

U.S. PATENT DOCUMENTS

| | | | | |
|---|---|---|---|---|
| 2012/0308235 | A1* | 12/2012 | Pusarla | H04B 10/1121 398/79 |
| 2013/0315603 | A1* | 11/2013 | Nadji | H04W 24/08 398/115 |
| 2015/0098709 | A1* | 4/2015 | Breuer | G06K 9/34 398/118 |
| 2016/0352422 | A1* | 12/2016 | Yue | H04B 10/116 |

FOREIGN PATENT DOCUMENTS

| | | | | |
|---|---|---|---|---|
| JP | 2007-194923 | A | 8/2007 | |
| JP | 2008-022089 | A | 1/2008 | |
| JP | 2009-177519 | A | 8/2009 | |
| JP | 2011-061267 | A | 3/2011 | |
| WO | WO-2015139159 | A1 * | 9/2015 | ............... H04B 1/38 |

OTHER PUBLICATIONS

English translation of Written opinion for PCT Application No. PCT/JP2017/010960.

\* cited by examiner

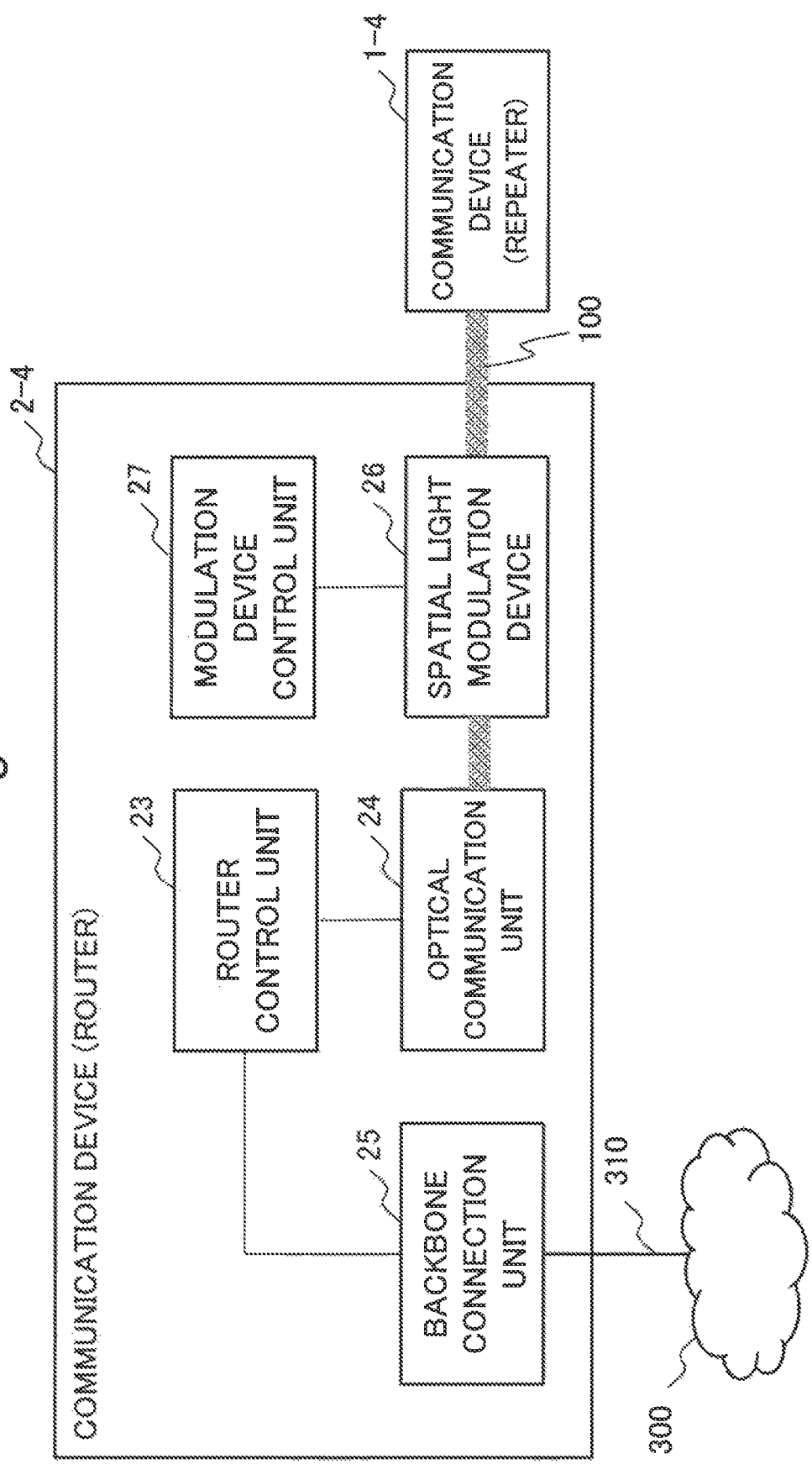

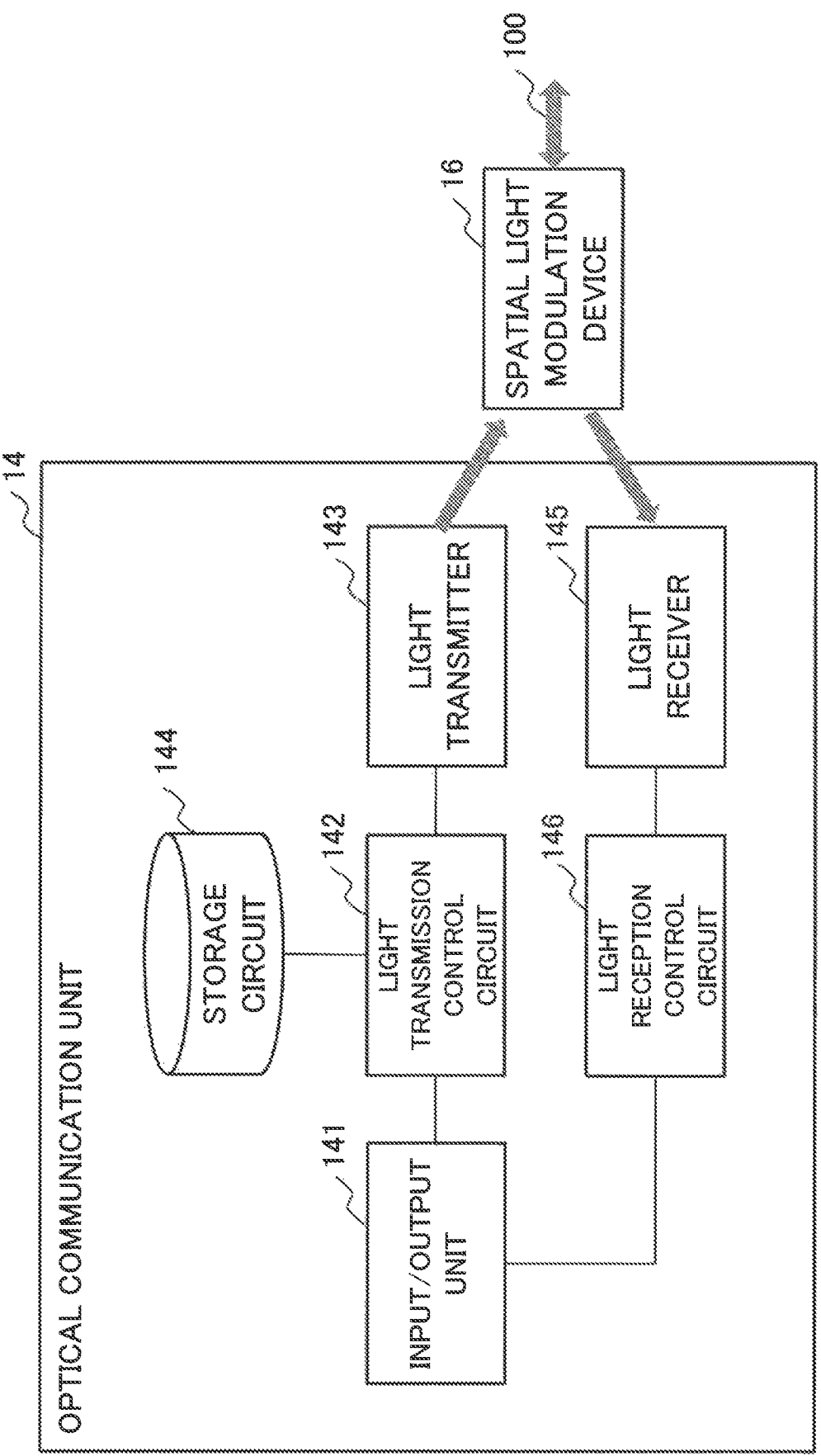

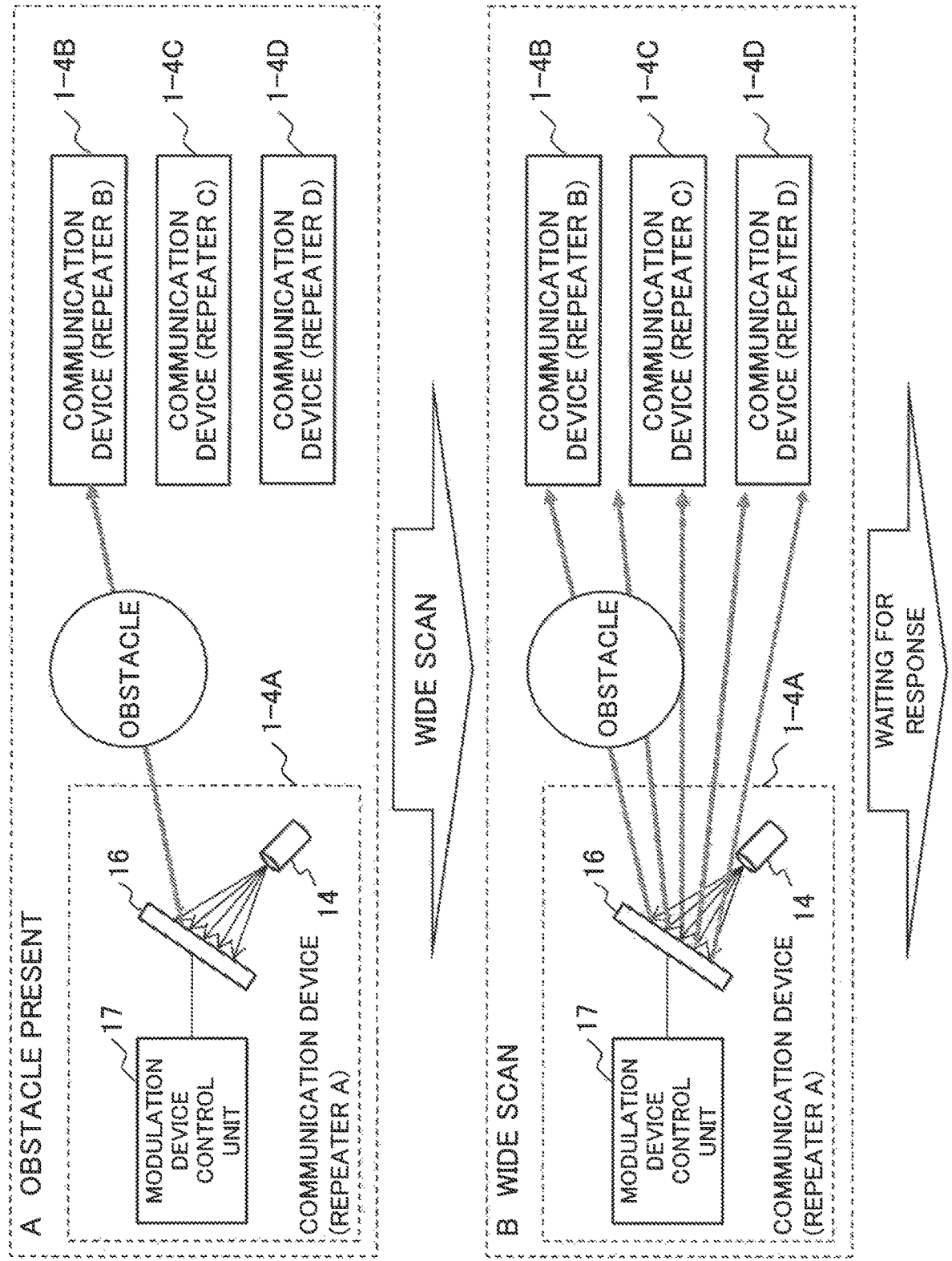

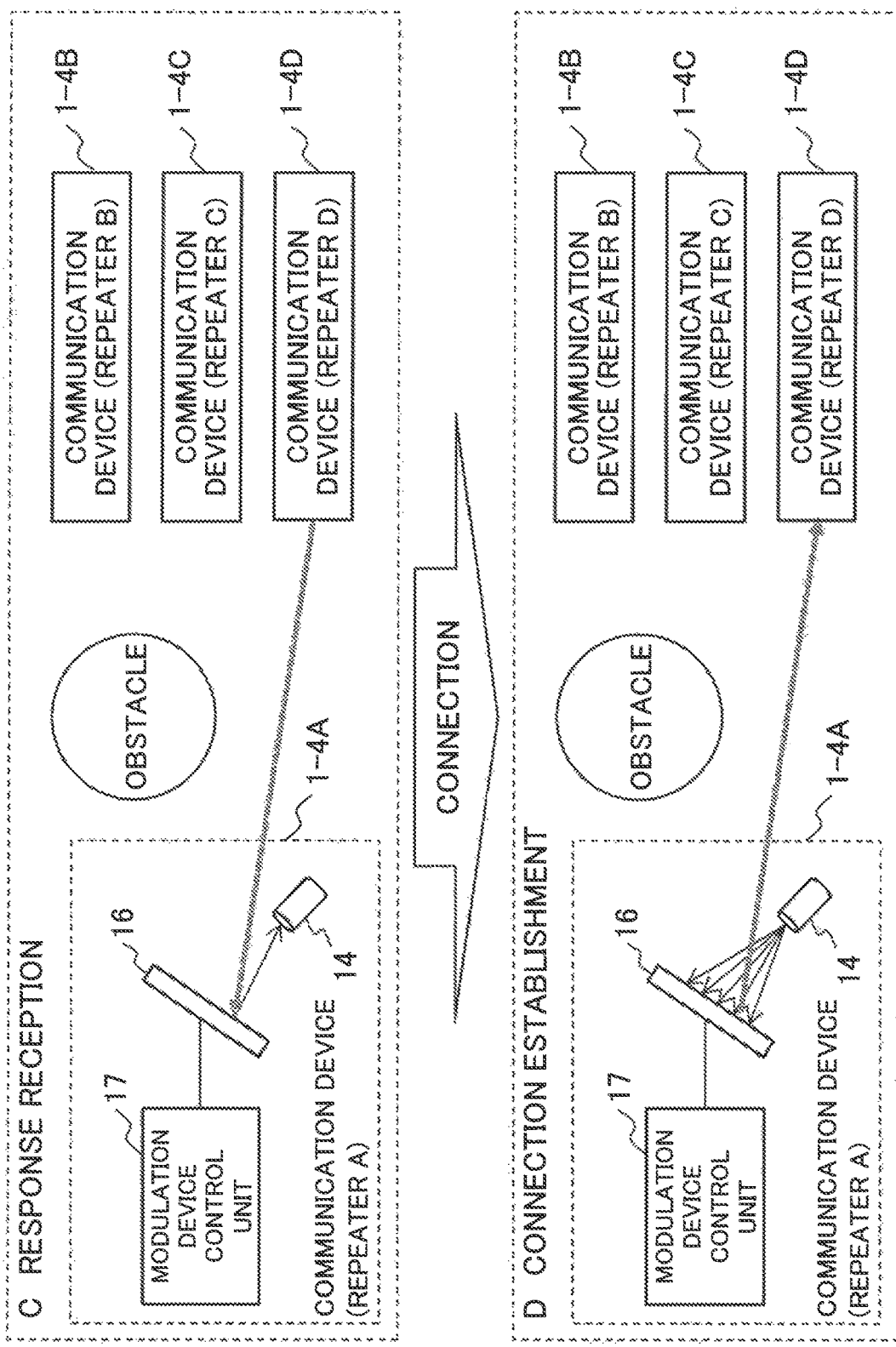

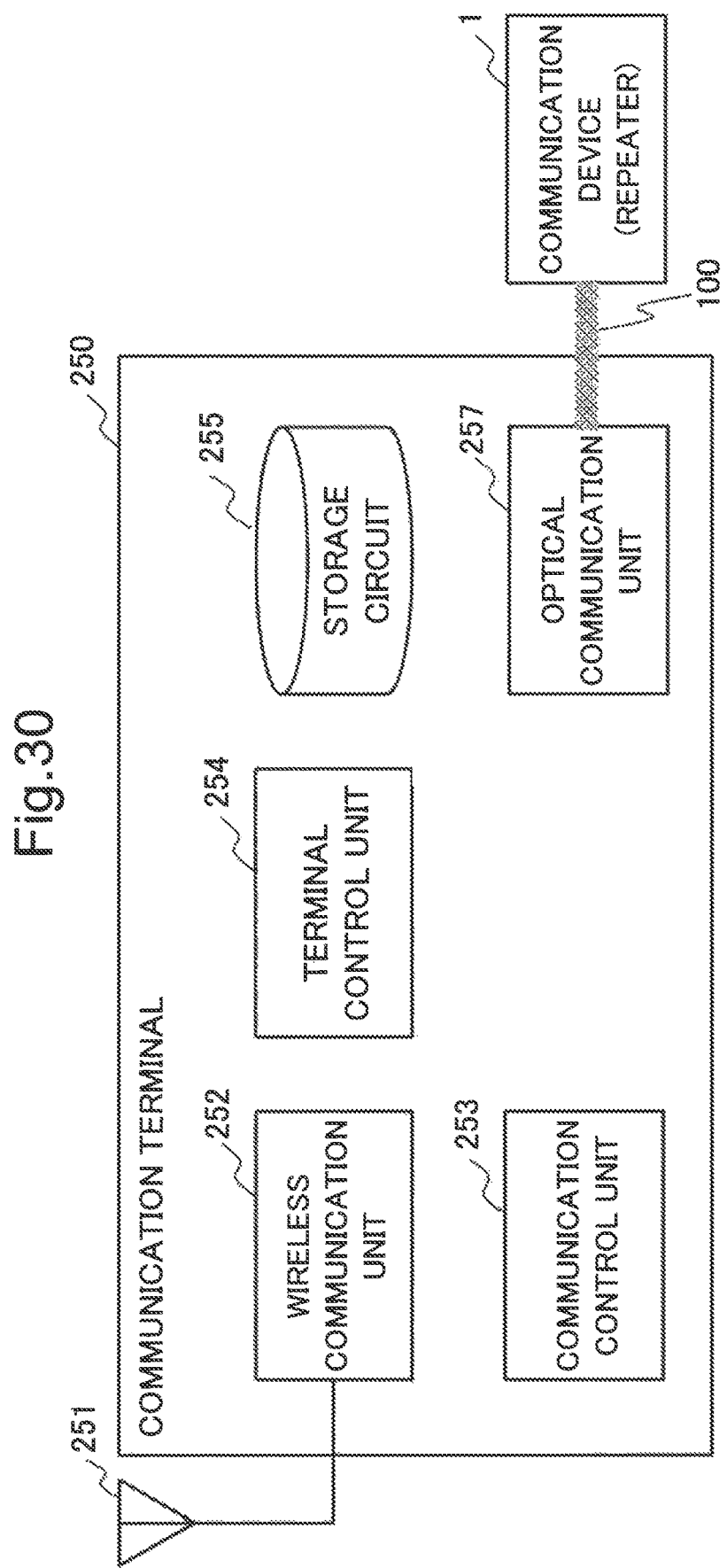

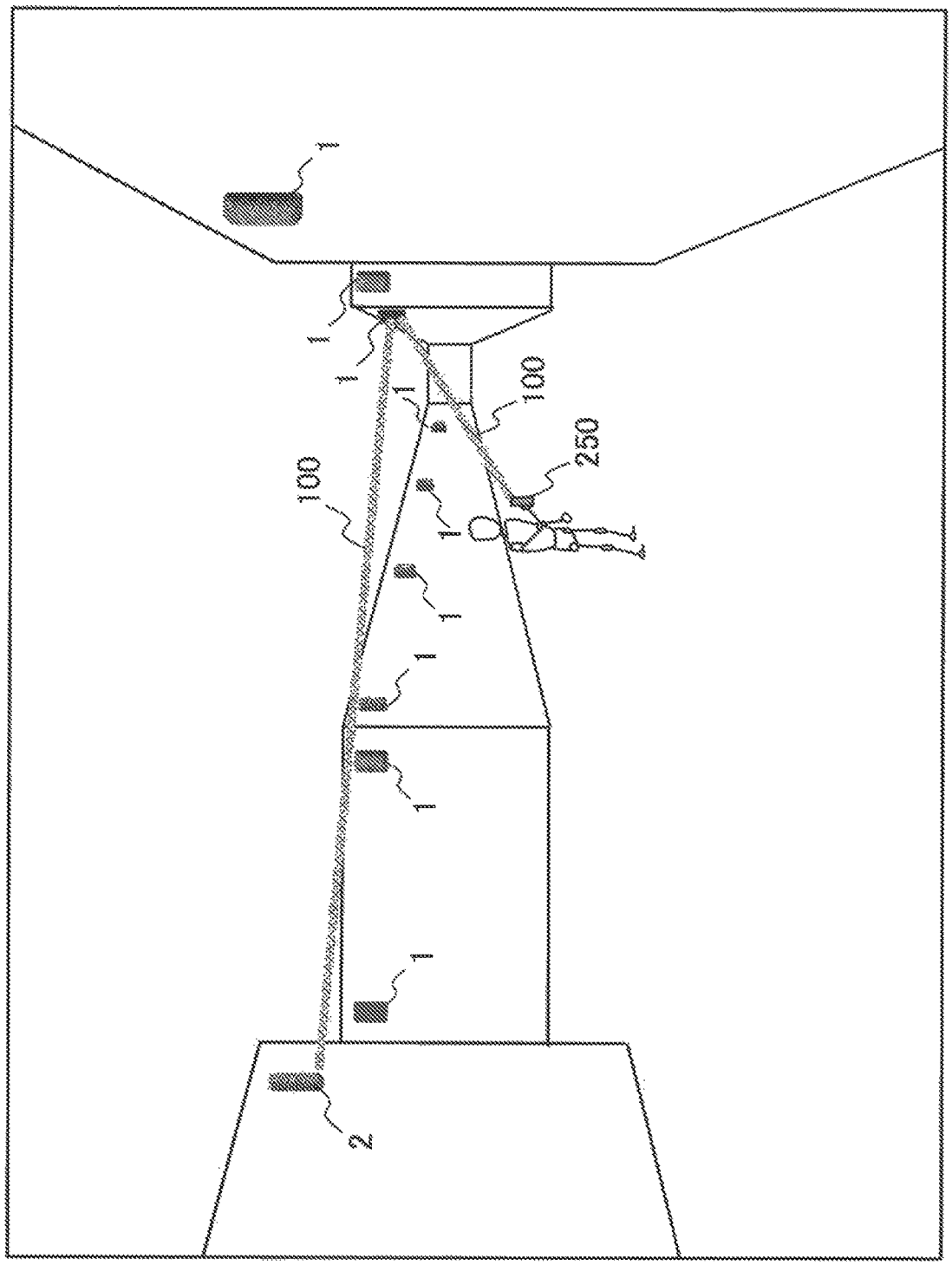

APPARATUS FOR CONVERSION BETWEEN WIRELESS SIGNALS AND SPATIAL LIGHT COMMUNICATION SIGNALS

This application is a National Stage Entry of PCT/JP2017/010960 filed on Mar. 17, 2017, which claims priority from Japanese Patent Application 2016-065877 filed on Mar. 29, 2016, the contents of all of which are incorporated herein by reference, in their entirety.

TECHNICAL FIELD

The present invention relates to a communication apparatus and a communication method. In particular, the present invention relates to a communication apparatus and a communication method configuring a wireless local area network (LAN).

BACKGROUND ART

In a wireless local area network (LAN), existence of a place where wireless terminals and base stations are densely arranged may result in failing to secure a communication band sufficiently due to radio interference. When each of base stations lowers transmission output to reduce a zone to be covered and the number of processes of each base station is reduced, it is possible to secure a communication band. However, when a zone to be covered is reduced for each base station, it is necessary to install a large number of base stations correspondingly. When the number of base stations is increased, the number of connection points to wired wide area network (WAN) is increased, which causes a problem of increase in wiring.

PTL 1 discloses a wireless communication system that exchanges a wireless signal between base stations configuring a wireless LAN. According to the wireless communication system in PTL 1, wiring between base stations is able to be reduced, since the base stations are wirelessly connected.

CITATION LIST

Patent Literature

[PTL 1] Japanese Unexamined Patent Application Publication No. 2008-22089

SUMMARY OF INVENTION

Technical Problem

According to the system in PTL 1, wiring between base stations by wire is omittable. However, as in the system in PTL 1, there is a problem that employing a wireless WAN for the purpose of reducing wiring may easily cause interference between WAN communication and user communication.

In order to solve the above-descried problem, an object of the present invention is to provide a communication apparatus that reduces wire connections and achieves a wireless communication environment securing a sufficient communication band.

Solution to Problem

A communication apparatus according to the present invention includes a wireless communication means for transmitting and receiving a wireless signal, an optical communication means for transmitting and receiving spatial light as communication light, and a control means for performing signal conversion in a process for converting the wireless signal and the communication light and setting a transmission destination of the wireless signal and the communication light.

A communication method according to the present invention arranges a plurality of communication apparatuses each including a wireless communication means for transmitting and receiving a wireless signal, an optical communication means for transmitting and receiving spatial light as communication light, and a control means for performing signal conversion in a process for converting the wireless signal and the communication light and setting a transmission destination of the wireless signal and the communication light, and performs control in such a manner that the different communication apparatuses communicate with each other by using the communication light.

Advantageous Effects of Invention

The present invention enables providing a communication device that reduces wire connections and achieves a wireless communication environment securing a sufficient communication band.

BRIEF DESCRIPTION OF DRAWINGS

FIG. 26 is a block diagram of a communication device (router) according to the fourth example embodiment of the present invention.

FIG. 27 is a block diagram illustrating one example relating to exchange of light between a light transmitter or a light receiver and a spatial light modulation device in the communication device according to the fourth example embodiment of the present invention.

FIG. 28 is a conceptual view of an application example of a communication system according to the fourth example embodiment of the present invention.

FIG. 29 is a conceptual view of an application example of the communication system according to the fourth example embodiment of the present invention.

FIG. 30 is a conceptual view of a communication terminal using a communication system according to a fifth example embodiment of the present invention.

FIG. 31 is a conceptual view of an application example of the communication system according to the fifth example embodiment of the present invention.

EXAMPLE EMBODIMENT

Figure 1:
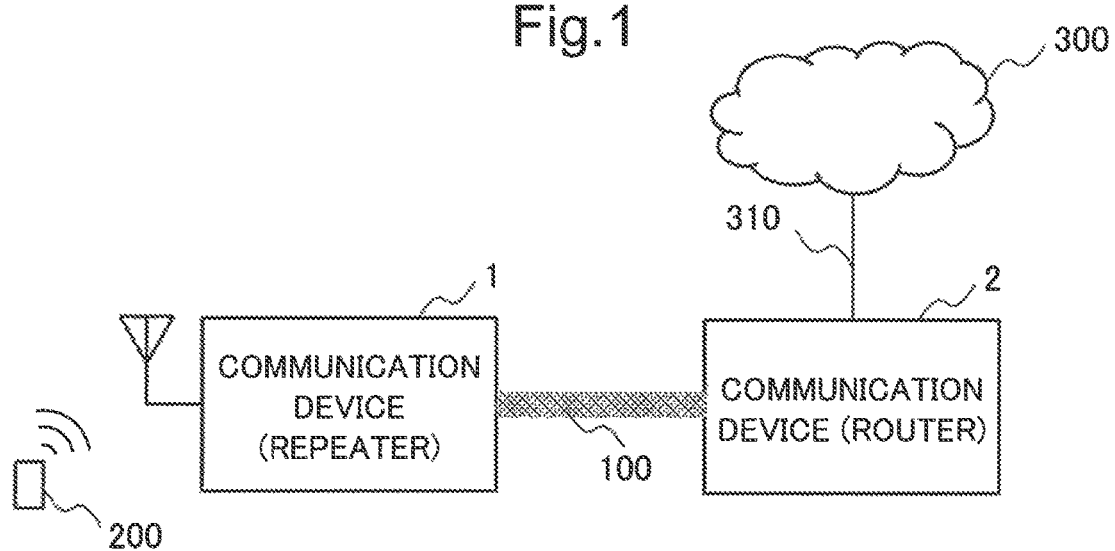
FIG. 1 is a conceptual view of a communication system according to a first example embodiment of the present invention.

In the following, example embodiments of the present invention are described by using the drawings. However, the example embodiments to be described below include technically preferable limitations in order to carry out the present invention, but the scope of the invention is not limited to the following.

Note that, similar elements are assigned with an identical reference sign throughout the drawings for use in the following description of the example embodiments, unless there is some particular reason. Further, in the following example embodiments, repeated description for similar configurations and operations may be omitted. Further, a direction of an arrow in the drawing indicates one example, and is not intended to limit a direction of a signal between blocks.

Further, in the following description, a component ending with "unit" is a combination of a circuit such as an operation circuit, a control circuit, a storage circuit, or an input/output circuit, and hardware such as a light source or a light receiver. Such components exhibit a function specific to each component on the basis of an algorithm or a program to be set.

First Example Embodiment (Configuration)

First, a communication system according to a first example embodiment of the present invention is described with reference to the drawings. FIG. 1 is a conceptual view illustrating a configuration of a wireless local area network (LAN) according to the present example embodiment.

As illustrated in FIG. 1, the wireless LAN (also referred to as a communication network) according to the present example embodiment includes a communication device 1 and a communication device 2. A communication terminal 200 is able to be connected with a backbone network 300 via the wireless LAN including the communication device 1 and the communication device 2. Note that the wireless LAN according to the present example embodiment may include the communication terminal 200. Further, FIG. 1 illustrates only one communication device 1 and one communication device 2, but a wireless LAN environment is preferably constructed with a configuration including a combination of at least one communication device 1 and a plurality of communication devices 2.

The communication device 1 has a function of a repeater of the wireless LAN. The communication device 1 is connected with the communication terminal 200 by wireless communication, in accordance with a common communication standard. The communication device 1 communicates with another communication device 1 or the communication device 2 by transmitting and receiving light to and from each other by spatial transmission, without passing through a wireline cable such as an optical cable. Hereinafter, light transmitted and received by spatial transmission without passing through a wireline cable is referred to as spatial light, and spatial light used in communication is referred to as communication light 100. For example, the communication device 1 uses, as the communication light 100, spatial light having high directivity such as laser light.

The communication device 2 has a function of a router of the wireless LAN. The communication device 2 communicates with the communication device 1 by using the communication light 100. The communication device 2 is connected by wire with the backbone network 300 such as the Internet. For example, the communication device 2 is connected with the backbone network 300 by using a wireline cable 310 such as an optical cable or a power transmission line, in accordance with a common communication standard.

[Communication Device (Repeater)]

Figure 2:
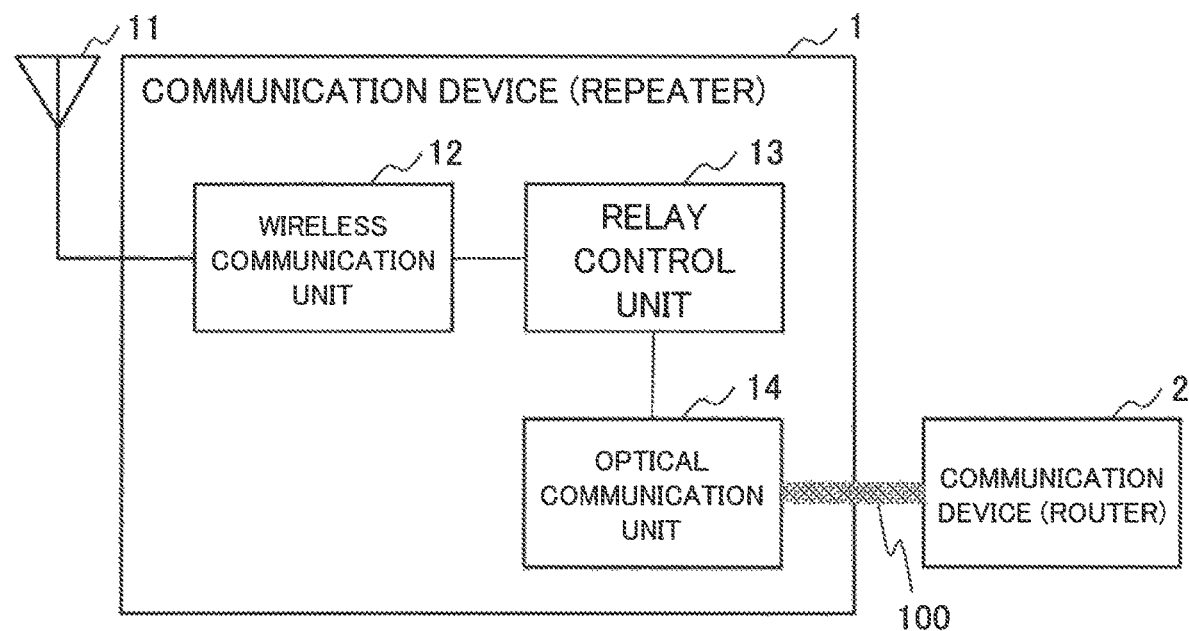
FIG. 2 is a block diagram of a communication device (repeater) according to the first example embodiment of the present invention.

Next, a configuration of the communication device 1 functioning as a repeater is described by using FIG. 2. As illustrated in FIG. 2, the communication device 1 includes an antenna 11, a wireless communication unit 12, a relay control unit 13, and an optical communication unit 14. FIG. 2 illustrates an example in which the communication device 1 and the communication device 2 communicate with each other by using the communication light 100, but the different communication devices 1 may communicate with each other, or the different communication devices 2 may communicate with each other.

The antenna 11 is an antenna for transmitting and receiving a wireless signal to and from the communication terminal 200. The antenna 11 may have a shape, a function, and a property conforming to a communication standard with the communication terminal 200.

The wireless communication unit 12 (also referred to as a wireless communication means) has a function of amplifying a radio frequency (RF) signal received by the antenna 11, or quadrature-demodulating the RF signal into an orthogonal frequency-division multiplexing (OFDM) signal. The wireless communication unit 12 outputs a demodulated signal to the relay control unit 13. Further, the wireless communication unit 12 quadrature-modulates an OFDM signal acquired from the relay control unit 13 into an RF signal, or power-amplifies an RF signal to be transmitted. However, a function or a property corresponding to a communication standard or a communication scheme may be added to, modified, or removed from the wireless communication unit 12 as appropriate.

The relay control unit 13 (also referred to as a relay control means) converts a demodulated signal in order to transmit the signal to another communication device or the communication device 2. For example, the relay control unit 13 converts an OFDM signal demodulated by the wireless communication unit 12 into an internet protocol (IP) packet, or converts an IP packet equivalent to the communication light 100 received by the optical communication unit 14 into an OFDM signal. However, a function or a property corresponding to a communication standard or a communication scheme may be added to, modified, or removed from the relay control unit 13 as appropriate.

The optical communication unit 14 (also referred to as an optical communication means) has a function of converting a signal demodulated by the wireless communication unit 12 into an optical signal, and transmitting the communication light 100 equivalent to the optical signal to the other communication device 1 or the communication device 2. Further, the optical communication unit 14 has a function of receiving the communication light 100 from the other communication device 1 or the communication device 2, and converting signal light equivalent to the communication light 100 into an electrical signal.

[Optical Communication Unit]

Figure 3:
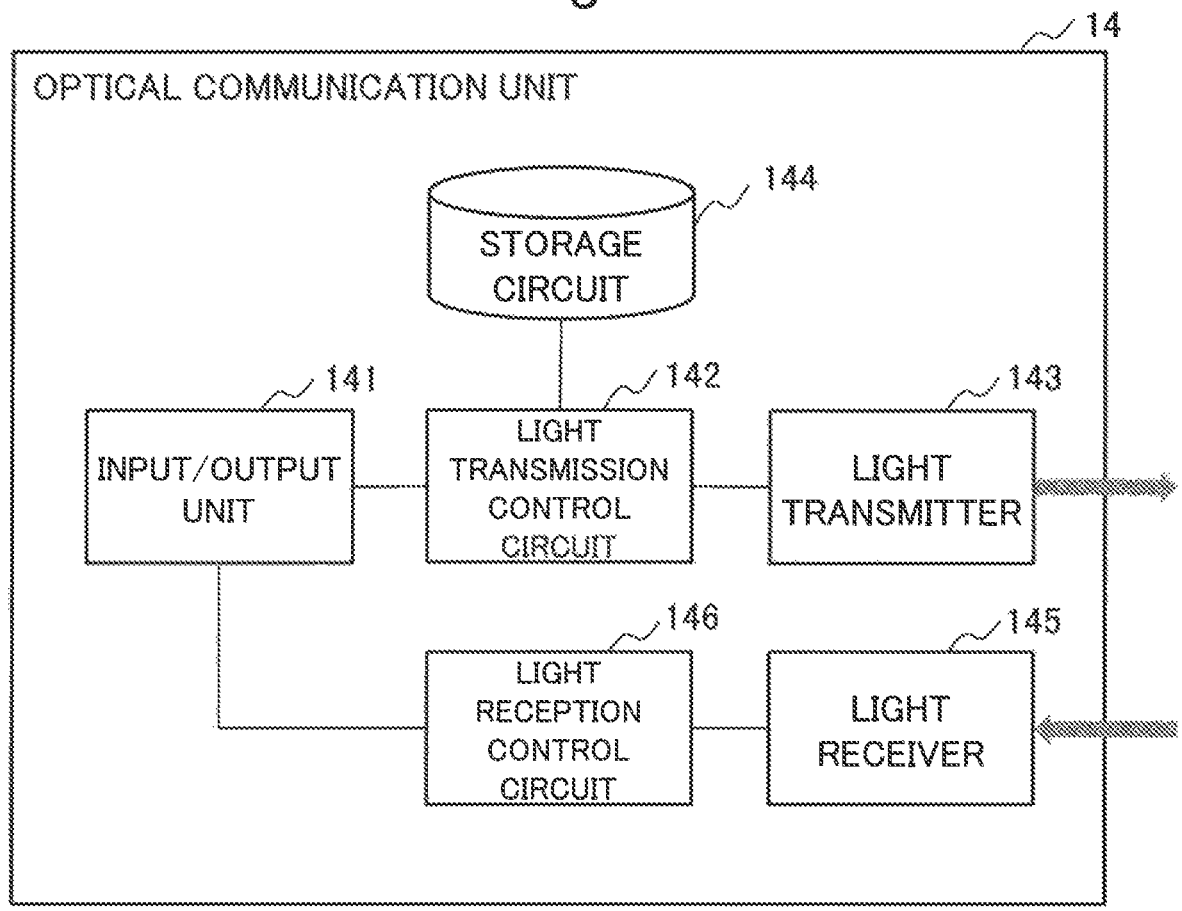
FIG. 3 is a block diagram of an optical communication unit of the communication device (repeater) according to the first example embodiment of the present invention.

FIG. 3 is a block diagram illustrating a configuration of the optical communication unit 14. As illustrated in FIG. 3, the optical communication unit 14 includes an input/output unit 141, a light transmission control circuit 142, a light transmitter 143, a storage circuit 144, a light receiver 145, and a light reception control circuit 146.

The input/output unit 141 is an interface that receives an electrical signal from the relay control unit 13 and outputs the electrical signal to the light transmission control circuit 142, and that outputs, to the relay control unit 13, an electrical signal obtained by converting an optical signal equivalent to the communication light 100 from the other communication device 1 or the communication device 2. Note that the input/output unit 141 may configure an input function and an output function with separate devices.

The light transmission control circuit 142 is a control circuit that controls the light transmitter 143 on the basis of an electrical signal acquired from the input/output unit 141, and causes the light transmitter 143 to transmit the communication light 100 toward the other communication device 1 or the communication device 2. The light transmission control circuit 142 controls the light transmitter 143 in such a manner that the light transmitter 143 transmits the communication light 100 on the basis of a light transmission condition stored in the storage circuit 144.

The light transmitter 143 transmits the communication light 100 toward the other communication device 1 or the communication device 2, in accordance with control of the light transmission control circuit 142. For example, the light transmitter 143 includes a light source such as a laser diode or a light emitting diode that emits light having high directivity. In particular, the light transmitter 143 is preferably able to transmit the communication light 100 (spatial light) by using a laser light source such as a laser diode.

The storage circuit 144 stores a light transmission condition of the light transmitter 143. A light transmission condition is a condition for setting, depending on a situation, the communication device 1 or the communication device 2 to which the communication light 100 is transmitted. A light transmission condition depending on a situation may be set, for example, such that the communication light 100 is transmitted to the approximate communication device 1 in a normal time, the communication light 100 is transmitted to another communication device 1 when the communication light 100 is interrupted, and the communication light 100 is transmitted directly to the distant communication device 2 in an emergency. The storage circuit 144 may store a table summarizing which device the communication light 100 is to be transmitted to and received from, depending on a situation.

The light receiver 145 receives the communication light 100 from the other communication device 1 or the communication device 2. For the light receiver, a light receiving element or an imaging device such as a photodiode, a complementary metal-oxide-semiconductor (CMOS), or a charge coupled device (CCD) may be applied. However, the light receiver 145 may be configured by using an element other than the above-described light receiving element or the imaging device, as long as being able to receive the communication light 100. Note that the light receiver 145 may have a function of converting an optical signal equivalent to the received communication light 100 into an electrical signal.

The light reception control circuit 146 converts the communication light 100 received by the light receiver 145 into an electrical signal, and outputs the electrical signal to the input/output unit 141. Note that the light receiver 145 and the light reception control circuit 146 may not be distinguished from each other, as long as the light receiver 145 is able to convert the communication light 100 into an electrical signal.

Figure 4:
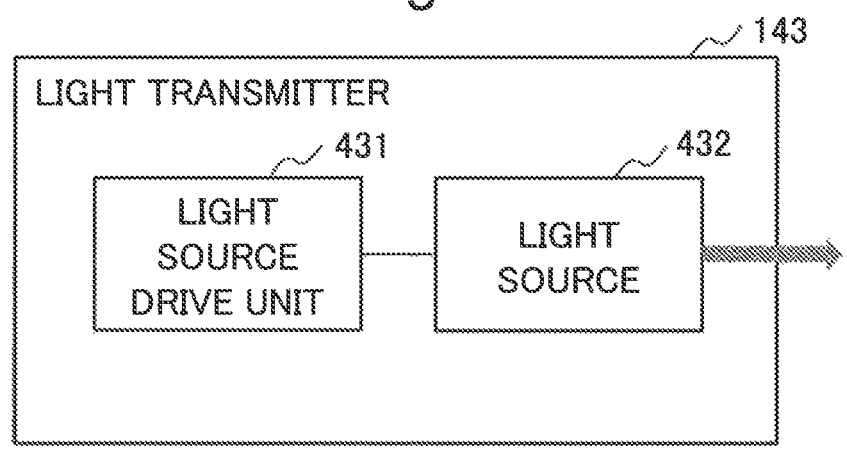
FIG. 4 is a block diagram of a light transmitter included in the optical communication unit of the communication device (repeater) according to the first example embodiment of the present invention.

FIG. 4 is a block diagram illustrating a configuration of the light transmitter 143. As illustrated in FIG. 4, the light transmitter 143 includes a light source drive unit 431 and a light source 432.

The light source drive unit 431 is a drive mechanism that includes a power source for driving the light source 432. The light source drive unit 431 drives the light source 432 in accordance with control of the light transmission control circuit 142. The light source drive unit 431 may be controlled in such a manner as to switch on and off the light source 432 correspondingly to "1" and "0" of an electrical signal.

The light source 432 is a light source that transmits the communication light 100. The light source 432 transmits the communication light according to driving of the light source drive unit 431. The light source 432 is a light source that includes a laser diode, a light emitting diode, or the like. Note that the light source 432 may emit light by using an element or a device other than a laser diode or a light emitting diode, as long as being able to transmit the communication light 100.

[Wireless Communication Unit]

Figure 5:
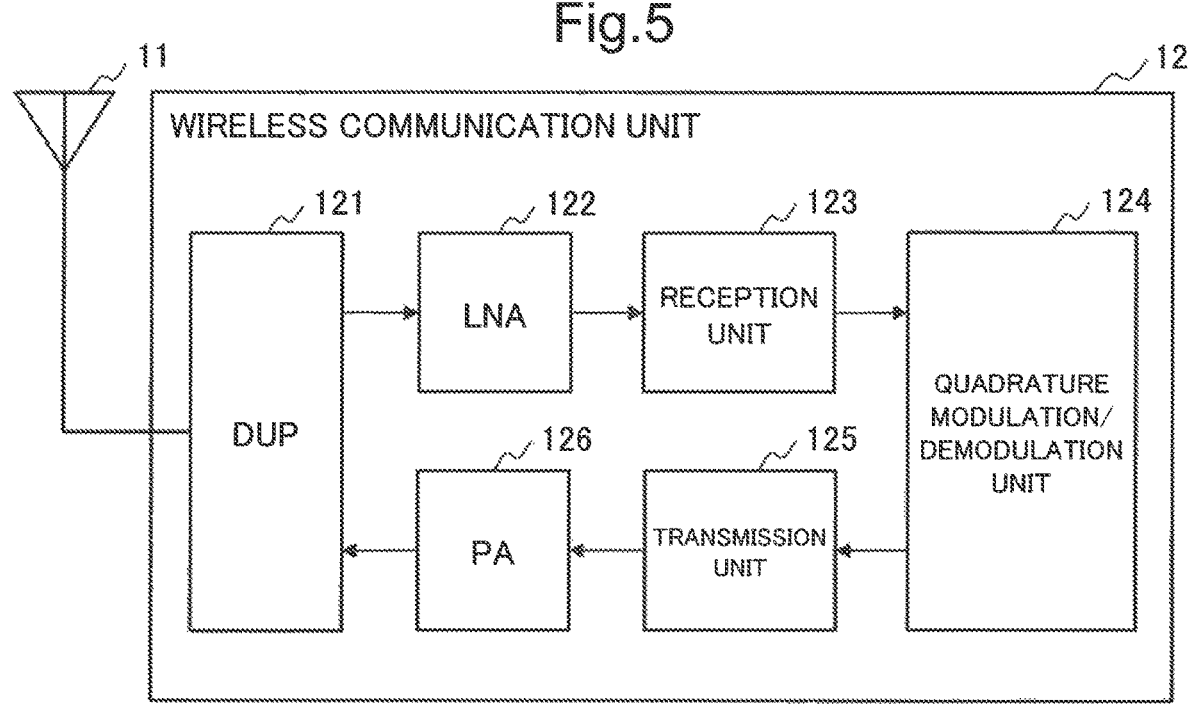
FIG. 5 is a block diagram of a wireless communication unit of the communication device (repeater) according to the first example embodiment of the present invention.

FIG. 5 is a block diagram illustrating a configuration example of the wireless communication unit 12. Note that, a configuration in FIG. 5 is one example for implementing the communication device 1 according to the present example embodiment, and is not intended to limit the scope of the present invention.

As illustrated in FIG. 5, the wireless communication unit 12 includes a duplexer 121, a low noise amplifier unit 122, a reception unit 123, a quadrature modulation/demodulation unit 124, a transmission unit 125, and a power amplifier unit 126. Note that the quadrature modulation/demodulation unit 124 is connected with the relay control unit 13 through a not-illustrated interface.

The duplexer (DUP) 121 is an electronic component that functions as a transmission/reception filter, and is for simultaneously exchanging an RF signal transmitted from the device internally and an RF signal received from the communication terminal 200. The duplexer 121 is connected with the antenna 11 through a cable or wiring.

The low noise amplifier unit (LNA) 122 selectively amplifies a weak RF signal received by the antenna 11, and outputs the amplified RF signal to the reception unit 123.

The reception unit 123 converts a received RF signal into a frequency to be processed by the quadrature modulation/demodulation unit 124, and outputs the converted RF signal to the quadrature modulation/demodulation unit 124.

The quadrature modulation/demodulation unit 124 quadrature-demodulates an RF signal converted by the reception unit 123 into an OFDM signal to be processed by the relay control unit 13, and outputs the OFDM signal. Further, the quadrature modulation/demodulation unit 124 quadrature-modulates an OFDM signal output by the relay control unit 13 into an RF signal, and outputs the RF signal to the transmission unit 125.

The transmission unit 125 converts an RF signal modulated by the quadrature modulation/demodulation unit 124 into a frequency to be transmitted from the antenna 11.

The power amplifier unit 126 power-amplifies an RF signal converted by the transmission unit 125 in order to transmit the RF signal from the antenna 11.

[Relay Control Unit]

Figure 6:
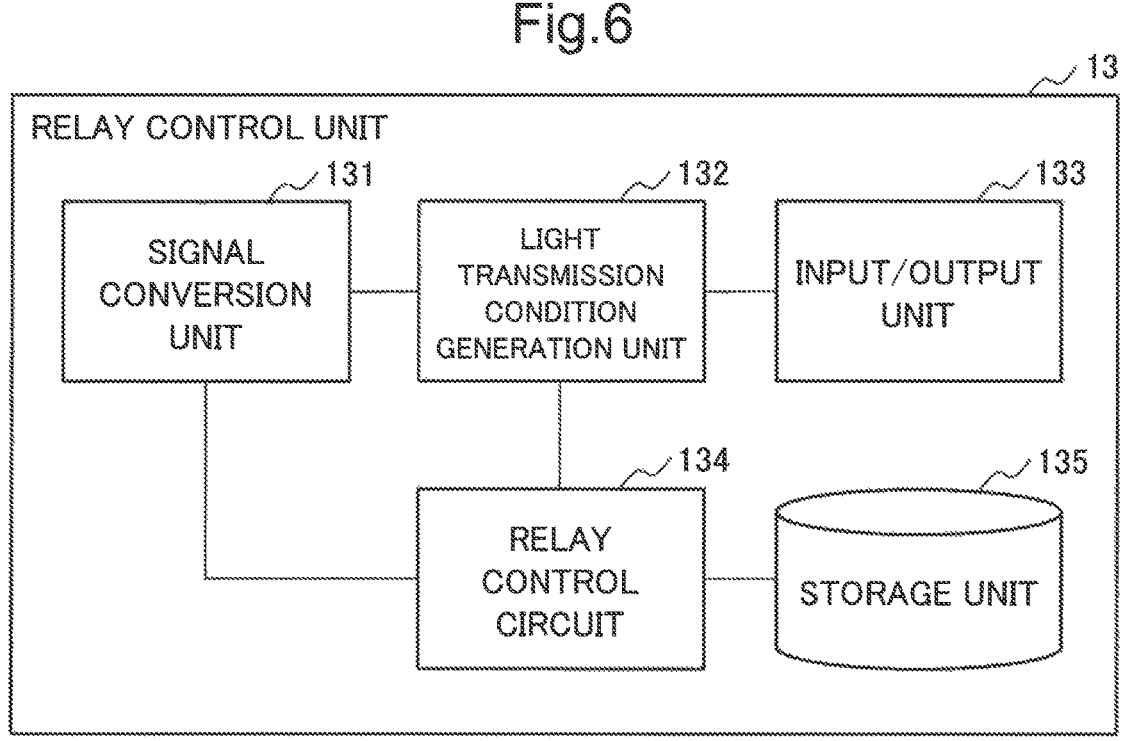
FIG. 6 is a block diagram of a relay control unit of the communication device (repeater) according to the first example embodiment of the present invention.

Next, a configuration of the relay control unit 13 is described by using FIG. 6. As illustrated in FIG. 6, the relay control unit 13 includes a signal conversion unit 131, a light transmission condition generation unit 132, an input/output unit 133, a relay control circuit 134, and a storage unit 135.

The signal conversion unit 131 converts a signal output from the quadrature modulation/demodulation unit 124 of the wireless communication unit 12, into a signal format to be transmitted to the other communication device 1 or the communication device 2. Further, the signal conversion unit 131 converts an electrical signal generated from an optical signal equivalent to the communication light 100 received from the other communication device 1 or the communication device 2, into a format to be processed by the wireless communication unit 12.

The light transmission condition generation unit 132 generates a light transmission condition for transmitting a signal converted by the signal conversion unit 131 as the communication light 100. A light transmission condition generated by the light transmission condition generation unit 132 may be stored in the storage circuit 144 of the optical communication unit 14. Note that, when it is not necessary to newly generate a light transmission condition, the light transmission condition generation unit 132 may be omitted.

The input/output unit 133 is an interface for exchanging a signal with the optical communication unit 14.

The relay control circuit 134 sets a transmission destination of the communication light 100 generated from an RF signal received from the communication terminal 200, or sets a next transmission destination of the communication light 100 received from the other communication device 1 or the communication device 2, on the basis of setting stored in the storage unit 135.

The storage unit 135 is a storage circuit for storing setting relating to a transmission destination of the communication light 100. Note that the storage unit 135 may store information other than setting relating to a transmission destination of the communication light 100.

[Communication Device (Router)]

Figure 7:
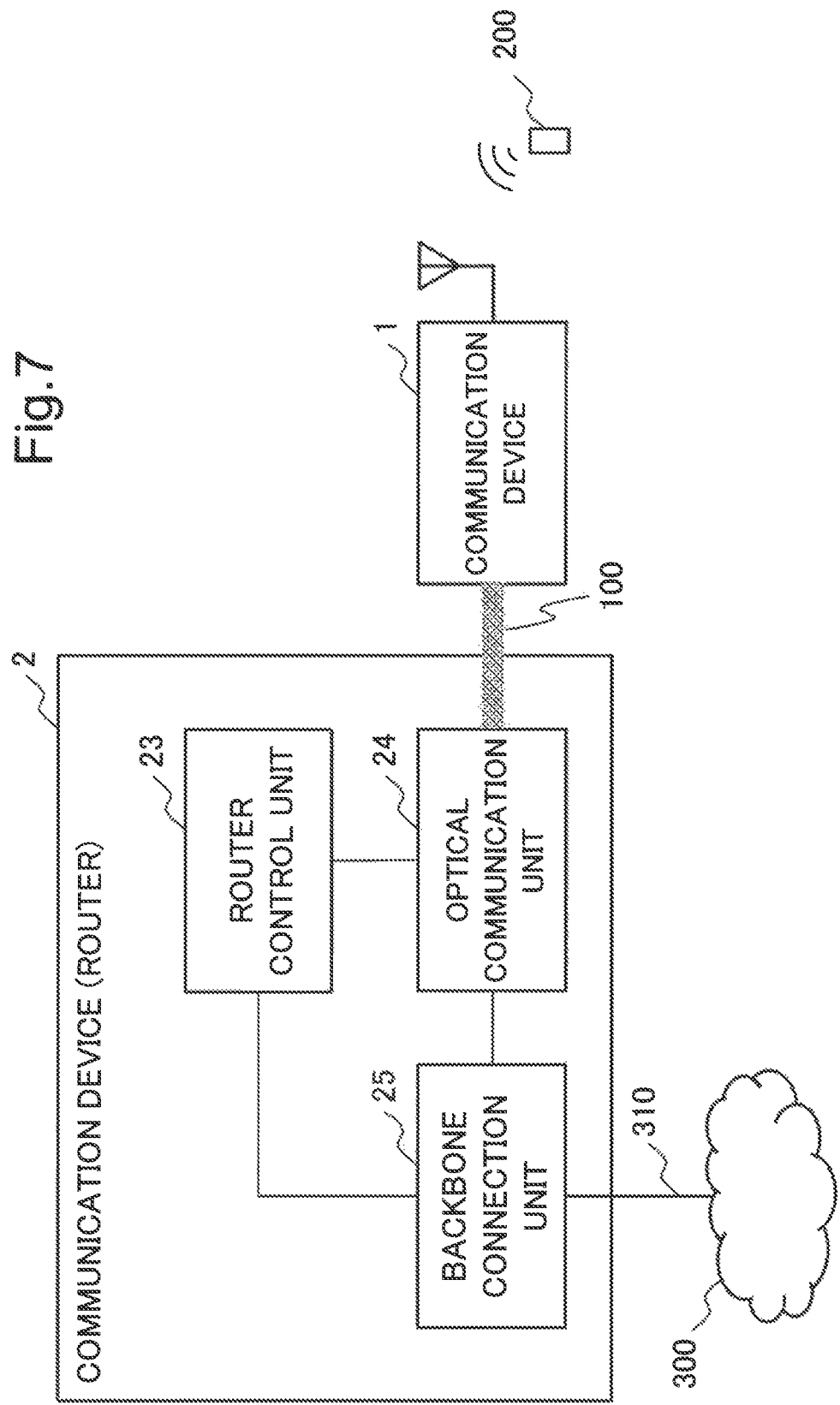
FIG. 7 is a block diagram of a communication device (router) according to the first example embodiment of the present invention.

Next, a configuration of the communication device 2 functioning as a router is described by using FIG. 7. As illustrated in FIG. 7, the communication device 2 includes a router control unit 23, an optical communication unit 24, and a backbone connection unit 25.

The router control unit 23 (also referred to as a router control means) converts signal light equivalent to the communication light 100 received by the optical communication unit 24 into an electrical signal, and sets a transmission destination of the electrical signal via the backbone network 300. The router control unit 23 transmits an electrical signal to the backbone network 300 in accordance with a common communication standard for a router.

The optical communication unit 24 (also referred to as an optical communication means) has a function of converting an electrical signal into the communication light 100 and transmitting the communication light 100 to the other communication device 1 or the communication device 2, in accordance with a condition set by the router control unit 23. Further, the optical communication unit 24 has a function of receiving the communication light 100 from another communication device 1 or the communication device 2. The optical communication unit 24 has a configuration similar to that of the optical communication unit 14 of the communication device 1.

The backbone connection unit 25 (also referred to as a backbone connection means) is an interface for connecting with the backbone network 300. The backbone connection unit 25 has a function of enabling transmission of an electrical signal in accordance with a common communication standard for a router. Generally, the backbone connection unit 25 is connected with the backbone network 300 by using the wireline cable 310. The backbone network 300 may be an external line such as the Internet, or may be an internal line such as a premise LAN.

[Router Control Unit]

Figure 8:
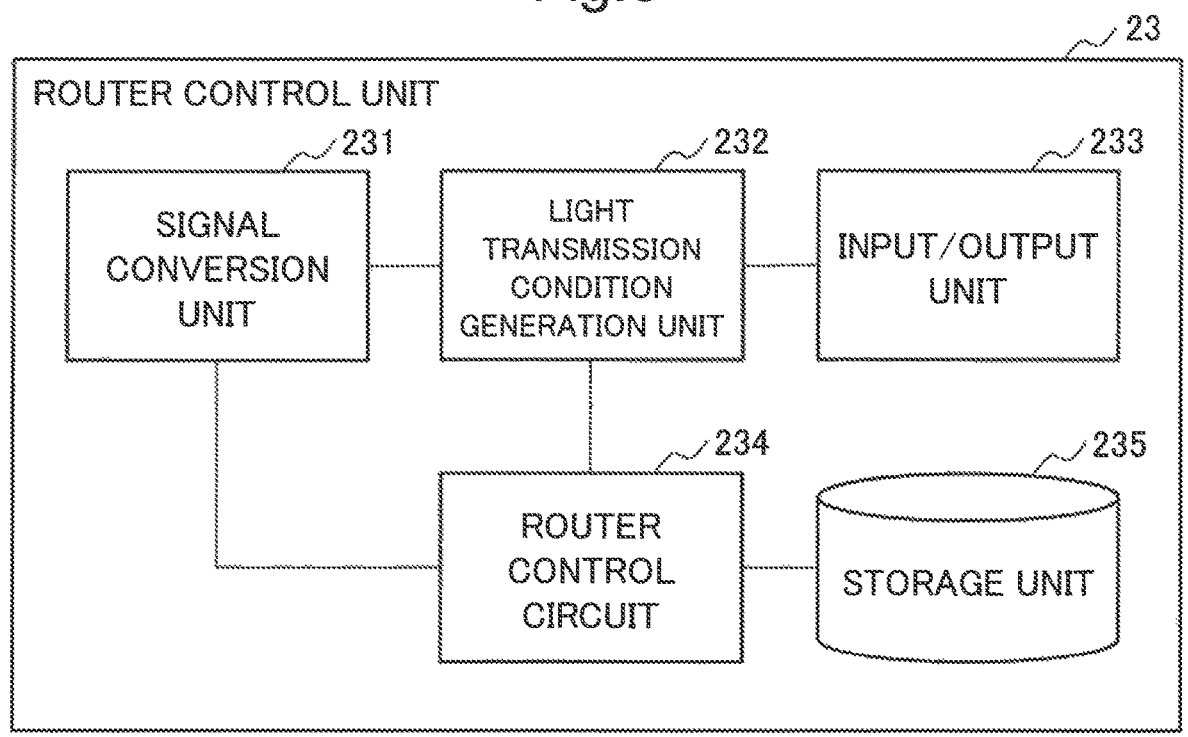
FIG. 8 is a block diagram of a relay control unit of the communication device (router) according to the first example embodiment of the present invention.

Next, a configuration of the router control unit 23 is described by using FIG. 8. As illustrated in FIG. 8, the router control unit 23 includes a signal conversion unit 231, a light transmission condition generation unit 232, an input/output unit 233, a router control circuit 234, and a storage unit 235. The router control unit 23 has a configuration similar to that of the relay control unit 13, except for the router control circuit 234.

The signal conversion unit 231 converts an electrical signal equivalent to the communication light 100 received from the other communication device 1 or the communication device 2 into a format to be transmitted from the backbone connection unit 25. Further, the signal conversion unit 231 converts a signal received via the backbone connection unit 25 into a format for generating the communication light 100.

The light transmission condition generation unit 232 converts a signal converted by the signal conversion unit 231, into a signal format to be transmitted to the other communication device 1 or the communication device 2.

The input/output unit 233 is an interface for exchanging a signal with the optical communication unit 24.

The router control circuit 234 sets a transmission destination of the communication light 100 generated from a signal received from the backbone network 300, or sets a next transmission destination of the communication light 100 received from the other communication device 1 or the communication device 2, on the basis of setting stored in the storage unit 235.

The storage unit 235 is a storage circuit for storing setting relating to a transmission destination of the communication light 100. Note that the storage unit 235 may store information other than setting relating to a transmission destination of the communication light 100.

Figure 9:
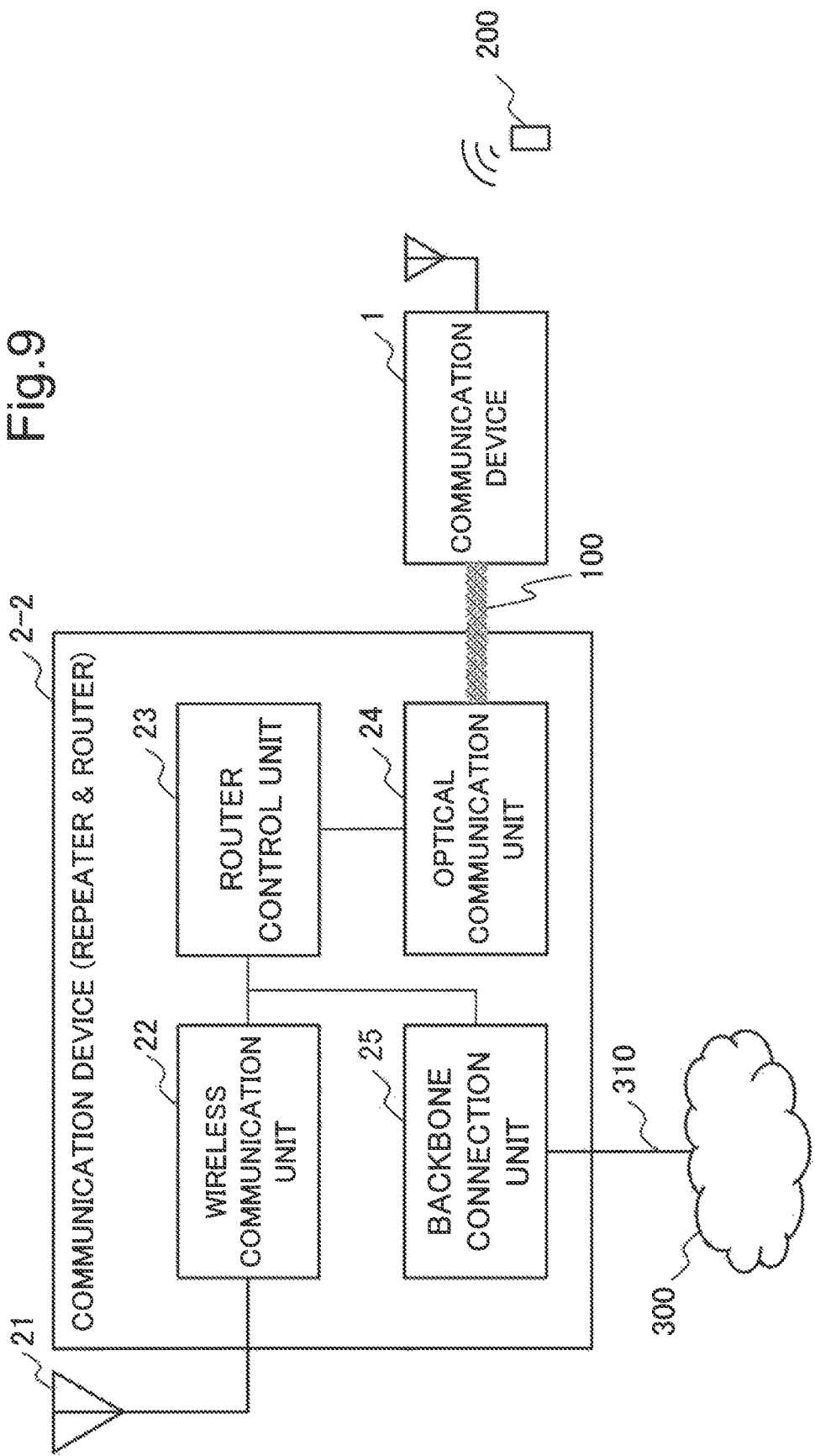
FIG. 9 is a block diagram of a modification example of the communication device (router) according to the first example embodiment of the present invention.

As illustrated in FIG. 9, the communication device 2 may be a configuration (a communication device 2-2) that includes an antenna 21 and a wireless communication unit 22. The communication device 2-2 in FIG. 9 has both a relay function and a router function.

The antenna 21 is an antenna for transmitting and receiving a wireless signal to and from the communication terminal 200, similarly to the antenna 11. The antenna 11 may have a shape, a function, and a property conforming to a communication standard with the communication terminal 200.

The wireless communication unit 22 has a function of amplifying an RF signal received by the antenna 21, or quadrature-demodulating the RF signal into an OFDM signal, similarly to the wireless communication unit 12. The wireless communication unit 22 outputs a demodulated signal to the router control unit 23. Further, the wireless communication unit 22 quadrature-modulates an OFDM signal acquired from the router control unit 23 into an RF signal, or amplifies an RF signal to be transmitted. Note that a relay control function may be added to the router control unit 23. When the router control unit 23 is added to the communication device 1 in FIG. 2, a configuration similar to that of the communication device 2-2 in FIG. 9 is also obtained.

[Control System]

Figure 10:
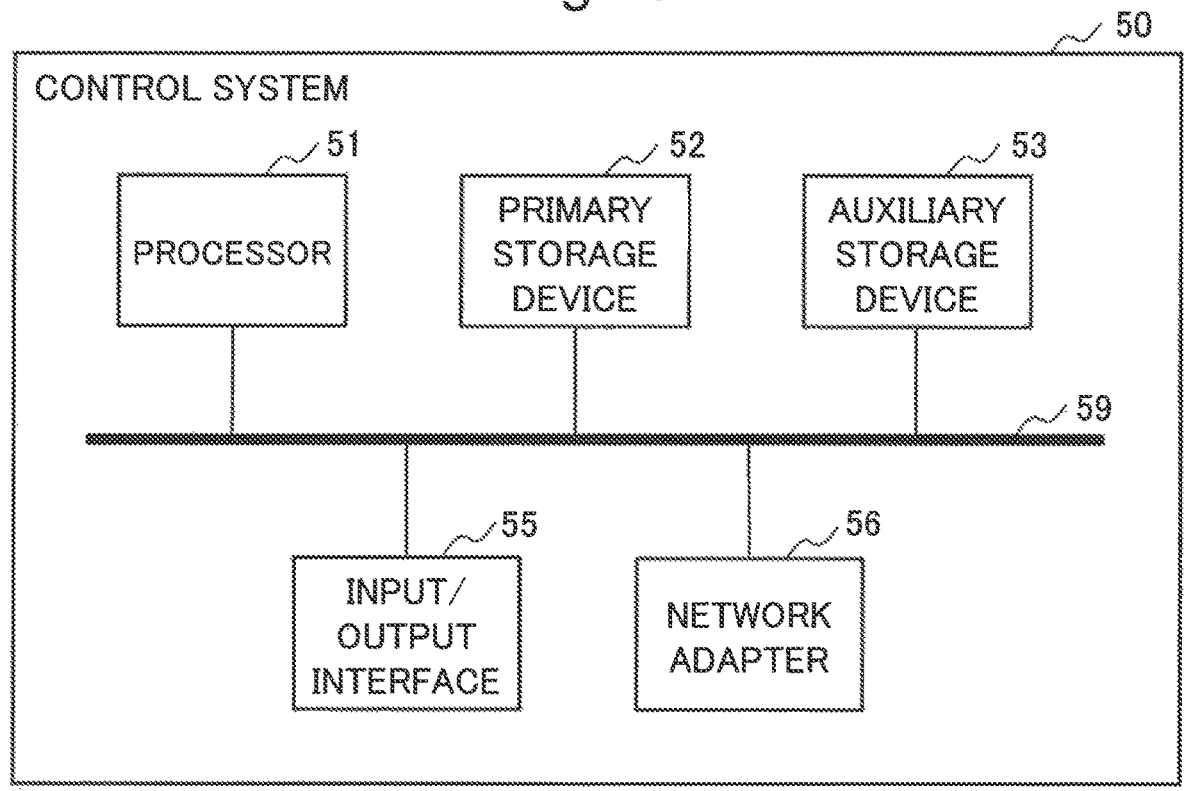
FIG. 10 is a block diagram of a control system implementing the communication device according to the first example embodiment of the present invention.

Here, hardware (a control system 50) implementing a control system for the communication device 1 and the communication device 2 according to the present example embodiment is described by using FIG. 10. Note that the control system 50 is one example for implementing the communication device 1 and the communication device 2, and is not intended to limit the scope of the present invention.

As illustrated in FIG. 10, the control system 50 includes a processor 51, a primary storage device 52, an auxiliary storage device 53, an input/output interface 55, and a network adapter 56. The processor 51, the primary storage device 52, the auxiliary storage device 53, the input/output interface 55, and the network adapter 56 are connected with one another through a bus 59. Further, the processor 51, the primary storage device 52, the auxiliary storage device 53, and the input/output interface 55 are connected with a network such as an intranet or the Internet, through the network adapter 56. The control system 50 is connected with another system, a device, or a sensor, through a network. Note that the component of the control system 50 may be singular, or may be plural.

The processor 51 is a central processing device that develops a program stored in the auxiliary storage device 53 or the like into the primary storage device 52 and executes the developed program. In the present example embodiment, configuration may be made such that a software program installed in the control system 50 is used. The processor 51 executes various kinds of arithmetic processing or control processing.

The primary storage device 52 has an area where a program is developed. The primary storage device 52 may be a volatile memory such as, for example, a dynamic random access memory (DRAM). Further, a non-volatile memory such as a magnetoresistive random access memory (MRAM) may be configured or added as the primary storage device 52.

The auxiliary storage device 53 is a means for storing various kinds of data. The auxiliary storage device 53 is configured as a local disk such as a hard disk or a flash memory. Note that the primary storage device 52 may be configured to store data and the auxiliary storage device 53 may be omitted.

The input/output interface 55 is an interface (I/F) that connects the control system 50 with a peripheral device on the basis of a connection standard.

Configuration may be made such that an input device such as a keyboard, a mouse, or a touch panel is able to be connected with the control system 50 as needed. Such input devices are used for inputting information and setting. Note that, in the case of using a touch panel as an input device, the touch panel may be a touch panel display in which a display screen of a display device serves as an interface of an input device. Data exchange between the processor 51 and an input device may be mediated by the input/output interface 55.

The network adapter 56 is an interface for connecting with the backbone network 300 such as the Internet or an intranet, on the basis of a standard or a specification. The input/output interface 55 and the network adapter 56 may be integrated as an interface for connecting with an external device.

APPLICATION EXAMPLE

Herein, an application example of the wireless LAN constructed by the communication device 1 and the communication device 2 according to the present example embodiment is described.

Figure 11:
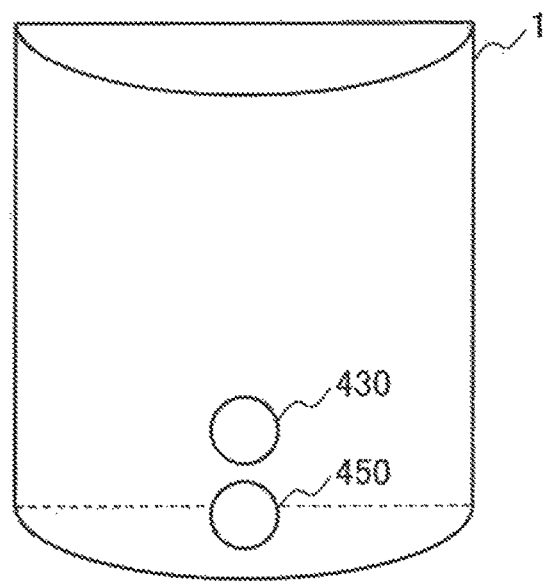
FIG. 11 is a conceptual view of an exterior of the communication device according to the first example embodiment of the present invention.

FIG. 11 is a conceptual view illustrating one example of an appearance of the communication device 1 according to the present example embodiment. Note that FIG. 11 is one example for implementing the communication device 1 according to the present example embodiment, and is not intended to limit the scope of the present invention.

The communication device 1 includes a light transmission window 430 for transmitting the communication light 100, and a light reception window 450 for receiving the communication light 100. Note that the light transmission window 430 and the light reception window 450 may be integrated. Further, an appearance of the communication device 2 is able to be also configured similarly to the communication device 1 in FIG. 11.

Figure 12:
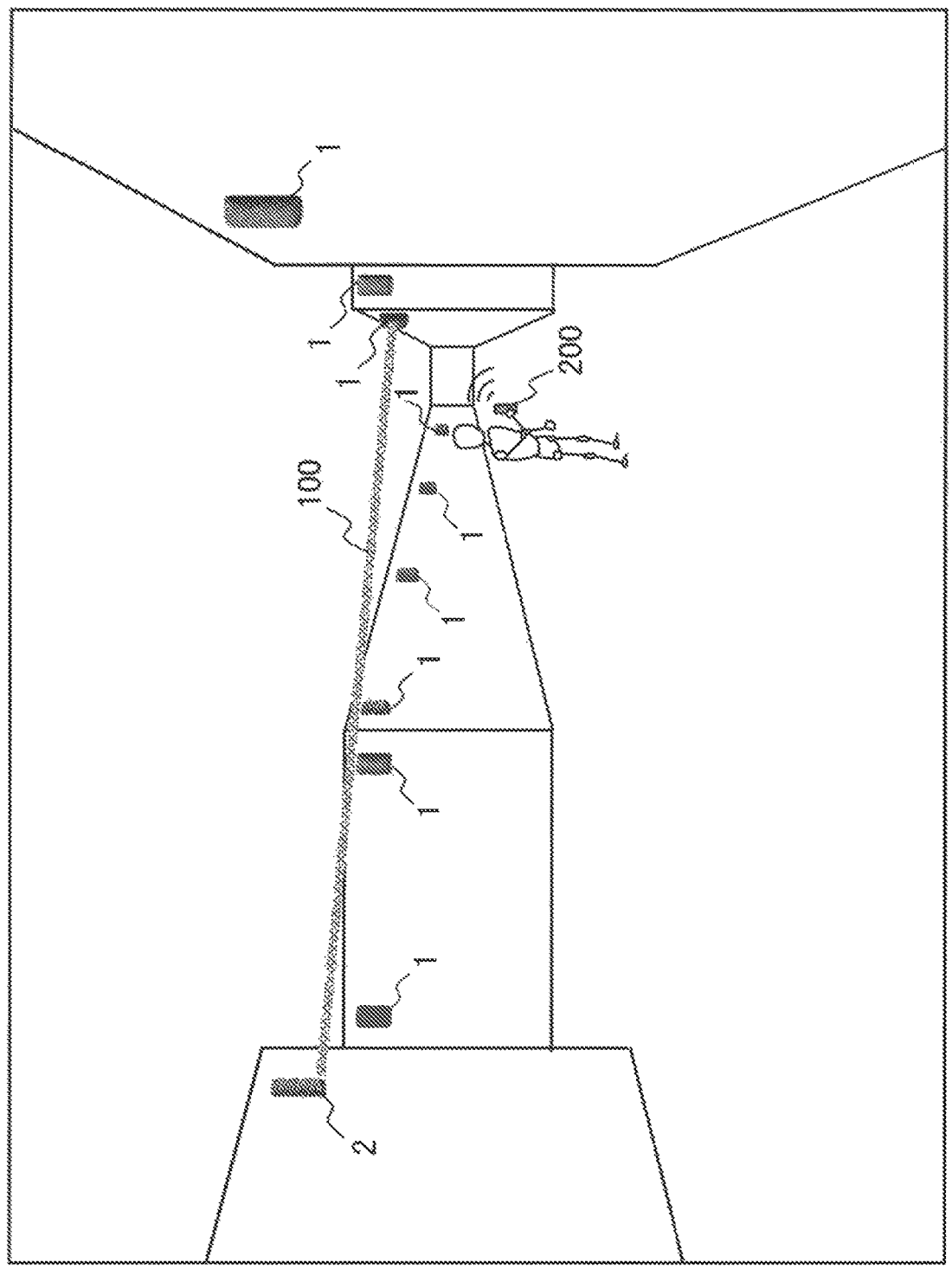
FIG. 12 is a conceptual view of an application example of the communication system according to the first example embodiment of the present invention.

FIG. 12 is a conceptual view illustrating a configuration example of the wireless LAN formed by the plurality of communication devices 1 and the communication device 2. In the configuration example in FIG. 12, a large number of the communication devices 1 that can be accessed by the communication terminal 200 by wireless communication are installed. When a large number of the communication devices 1 are installed as in FIG. 12, a sufficient communication band is secured by setting a zone covered by each communication device 1 to be narrow.

The communication devices 1 communicate with each other by using the communication light 100. Further, all of the communication devices 1 are connected with the backbone network 300 through the communication device 2 having a router function. The communication device 1 may transmit and receive the communication light 100 directly to and from the communication device 2, when being able to transmit and receive light directly to and from the communication device 2. The communication device 1 may transmit and receive the communication light 100 to and from the communication device 2 by relaying through any of the communication devices 1, when being unable to transmit and receive light directly to and from the communication device 2.

The communication device 2 having a router function communicates with the plurality of communication devices 1 by using the communication light 100. The communication device 2 may transmit and receive the communication light 100 directly to and from the communication device 1, when being able to transmit and receive light directly. The communication device 2 may transmit and receive the communication light 100 to and from the communication device 1 by relaying through any of the communication devices 1, when being unable to transmit and receive light directly.

The communication terminal 200 communicates with any of the communication devices 1 by wireless communication. In the example in FIG. 12, the communication terminal 200 communicates with the neighboring communication device 1 by wireless communication. The communication device 1 communicating with the communication terminal 200 transmits and receives the communication light 100 to and from the communication device 2 having a router function. As a result, the communication terminal 200 can be connected with the backbone network 300 through the communication device 1 and the communication device 2.

Figure 13:
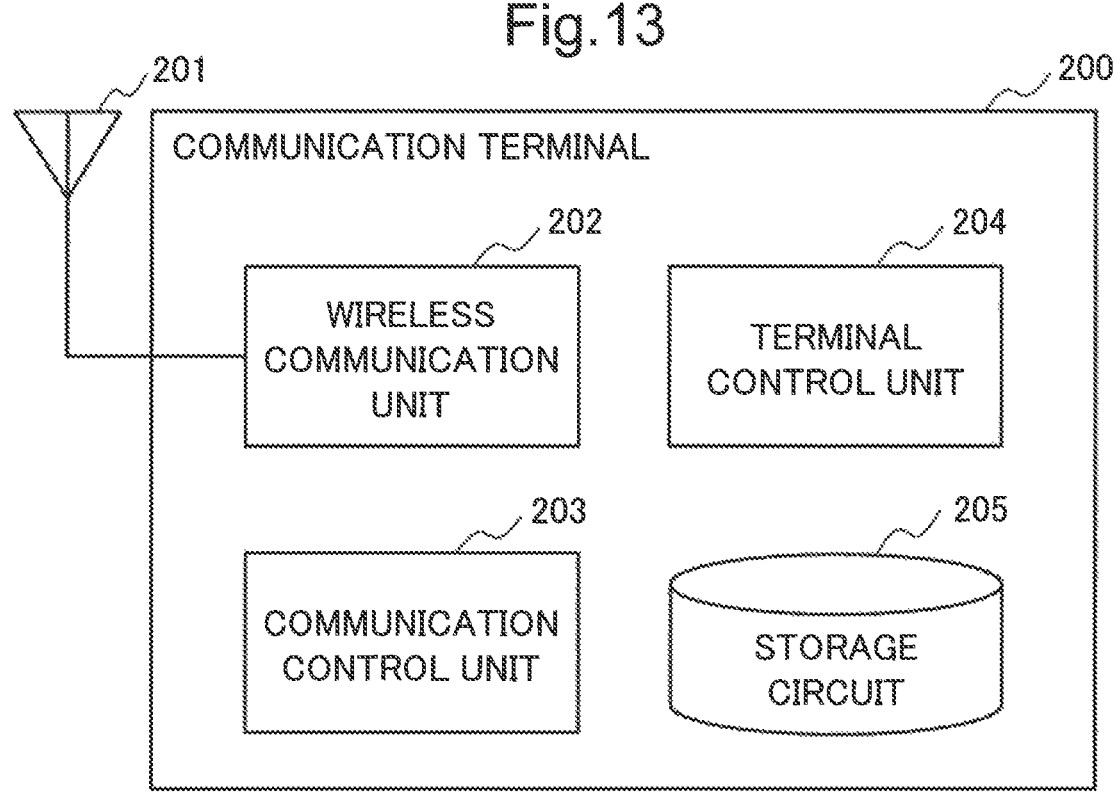
FIG. 13 is a conceptual view of a communication terminal using the communication system according to the first example embodiment of the present invention.

FIG. 13 is a block diagram illustrating one example of the communication terminal 200. The communication terminal 200 includes an antenna 201, a wireless communication unit 202, a communication control unit 203, a terminal control unit 204, and a storage circuit 205. Note that a configuration in FIG. 13 is one example, and is not intended to limit the scope of the present invention.

The antenna 201 is an antenna for transmitting and receiving a wireless signal to and from the communication device 1 or the communication device 2. The antenna 201 may be exposed outside the communication terminal 200, or may be stored inside.

The wireless communication unit 202 has a function of communicating a wireless signal with the communication device 1 or the communication device 2 through the antenna 201.

The communication control unit 203 has a function of searching for a connection destination of the wireless communication unit 202, or performing communication control such as a connection request for the communication device 1 or the communication device 2.

The terminal control unit 204 has a function of performing control for the overall communication terminal 200.

The storage circuit 205 is a circuit that stores data or a control condition of the communication terminal 200.

The communication terminal 200 may include a component other than those illustrated in FIG. 13. Further, the communication terminal 200 may be configured by adding various functions to the configuration illustrated in FIG. 13, or making modifications to the configuration illustrated in FIG. 13.

Herein, transmission and reception of the communication light 100 in the wireless LAN configured by the communication device 1 and the communication device 2 is described by using FIGS. 14 to 17. FIGS. 14 to 17 are views of a place illustrated by the application example in FIG. 12 when seen from above.

Figure 14:
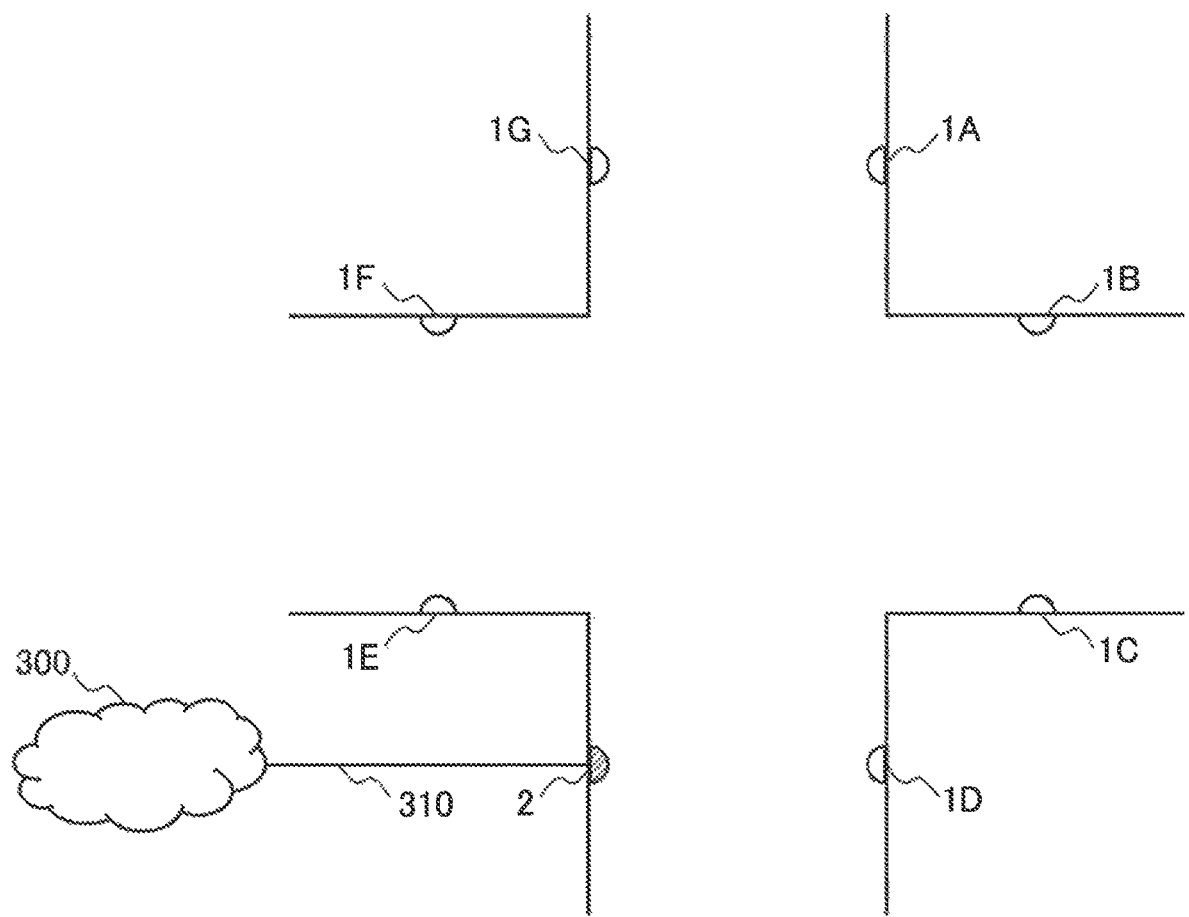
FIG. 14 is a conceptual view of an arrangement example of the communication system according to the first example embodiment of the present invention.

As in FIG. 14, the seven communication devices 1 having a relay function and the communication device 2 having a router function are installed near a crossroad. The seven communication devices 1 include a communication device 1A, a communication device 1B, a communication device 1C, a communication device 1D, a communication device 1E, a communication device 1F, and a communication device 1G. The communication device 2 is connected with the backbone network 300 through the wireline cable 310.

Figure 15:
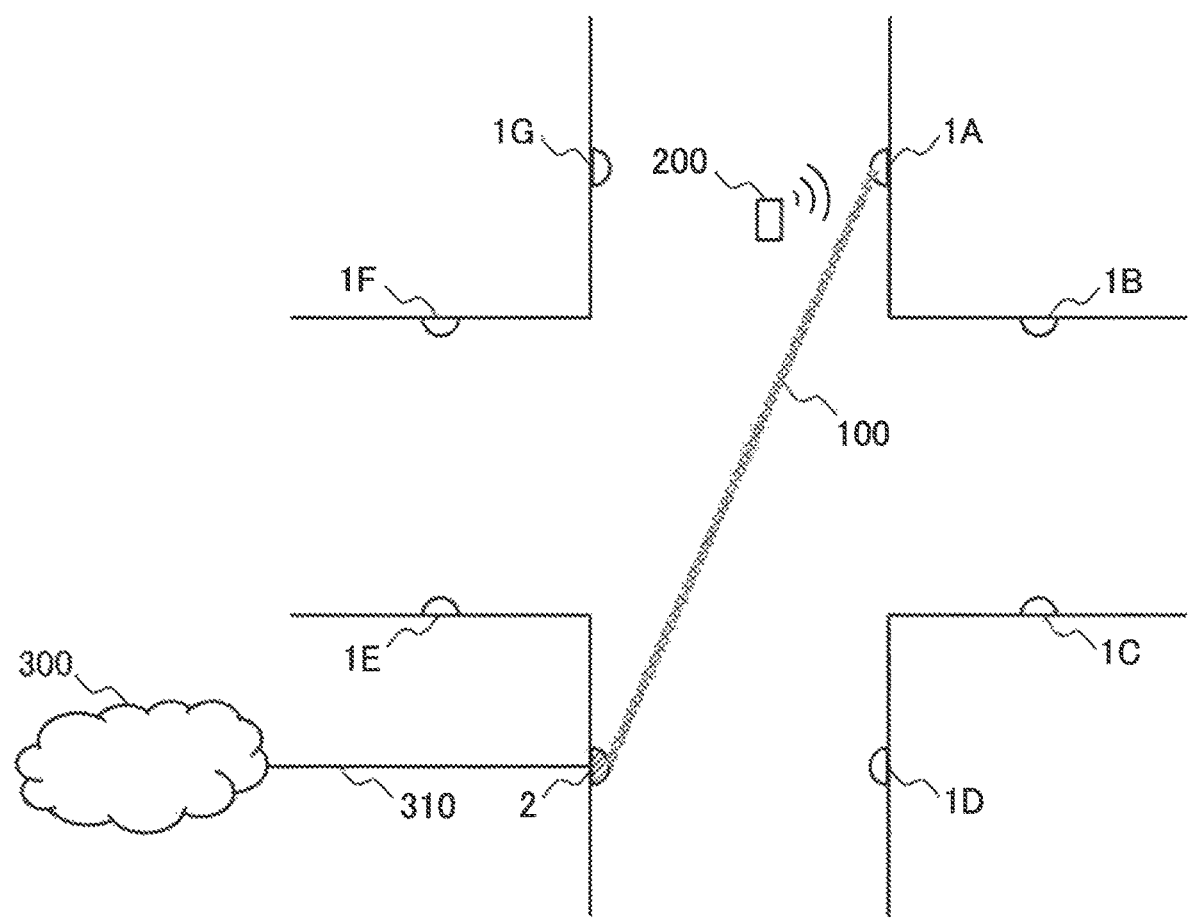
FIG. 15 is a conceptual view of a communication example in the communication system according to the first example embodiment of the present invention.

FIG. 15 is an example in which the communication terminal 200 is connected with the backbone network 300 through the communication device 1A that is able to transmit and receive the communication light 100 directly to and from the communication device 2. The communication device 1A transmits and receives a wireless signal to and from the communication terminal 200, and transmits and receives the communication light 100 to and from the communication device 2. As a result, the communication terminal 200 and the backbone network 300 are connected with each other.

Figure 16:
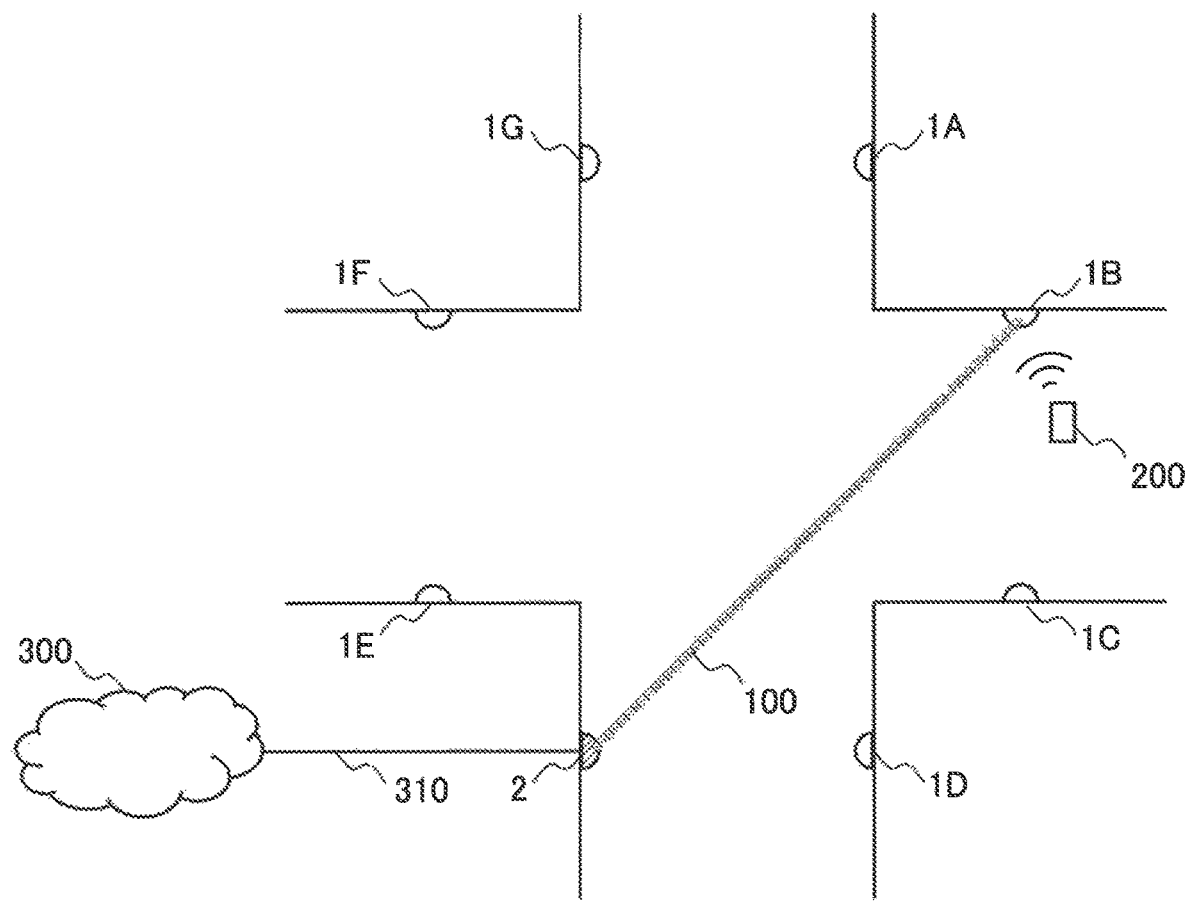
FIG. 16 is a conceptual view of a communication example in the communication system according to the first example embodiment of the present invention.

FIG. 16 is an example in which the communication terminal 200 is connected with the backbone network 300 through the communication device 1B that is able to transmit and receive the communication light 100 directly to and from the communication device 2. Similarly to FIG. 15, the communication device 1B transmits and receives a wireless signal to and from the communication terminal 200, and transmits and receives the communication light 100 to and from the communication device 2. As a result, the communication terminal 200 and the backbone network 300 are connected with each other.

Figure 17:
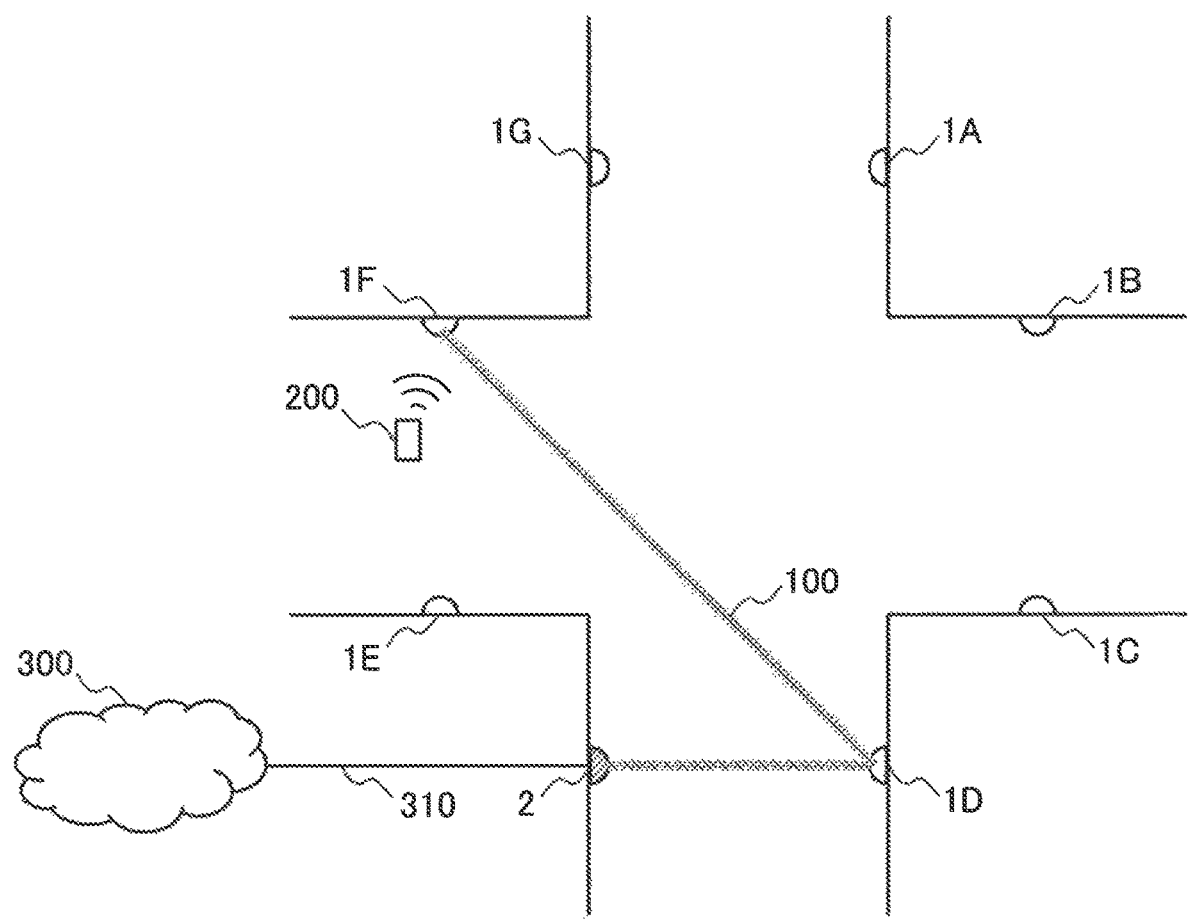
FIG. 17 is a conceptual view of a communication example in the communication system according to the first example embodiment of the present invention.

FIG. 17 is an example in which the communication terminal 200 is connected with the backbone network 300 through the communication device 1F that is unable to transmit and receive the communication light 100 directly to and from the communication device 2. The communication device 1F transmits and receives a wireless signal to and from the communication terminal 200. Then, the communication device 1F transmits and receives the communication light 100 to and from the communication device 2 by relaying through the communication device 1D. As a result, the communication terminal 200 and the backbone network 300 are connected with each other.

As described above, in the communication device according to the present example embodiment, communication between communication devices configuring a wireless communication network is performed by using communication light. Thus, the communication device according to the present example embodiment is able to reduce wire connections between devices.

Further, the communication device according to the present example embodiment is able to reduce interference between communication terminals, by lowering output of a wireless signal of each device and generating a large number of small zones. Thus, the communication device according to the present example embodiment is able to secure a communication band sufficiently.

In other words, the communication device according to the present example embodiment is able to provide a communication device that reduces wire connections and achieves a wireless communication environment securing a sufficient communication band.

Further, when communication between communication devices is performed by wireless communication, a communication content may be intercepted by another wireless terminal. In contrast, the communication device according to the present example embodiment performs communication by using communication light, and thus, a communication content is not intercepted unless the communication light is received directly. In other words, the communication device according to the present example embodiment can enhance security of communication in a wireless communication network.

Second Example Embodiment

Next, a communication device according to a second example embodiment of the present invention is described with reference to the drawings. The present example embodiment is different from the first example embodiment in having a function of changing a transmission direction and a reception direction of communication light. Note that the communication device according to the present example embodiment has a configuration similar to that of the first example embodiment except for an optical communication unit, and thus, detailed description about the similar configuration is omitted.

Figure 18:
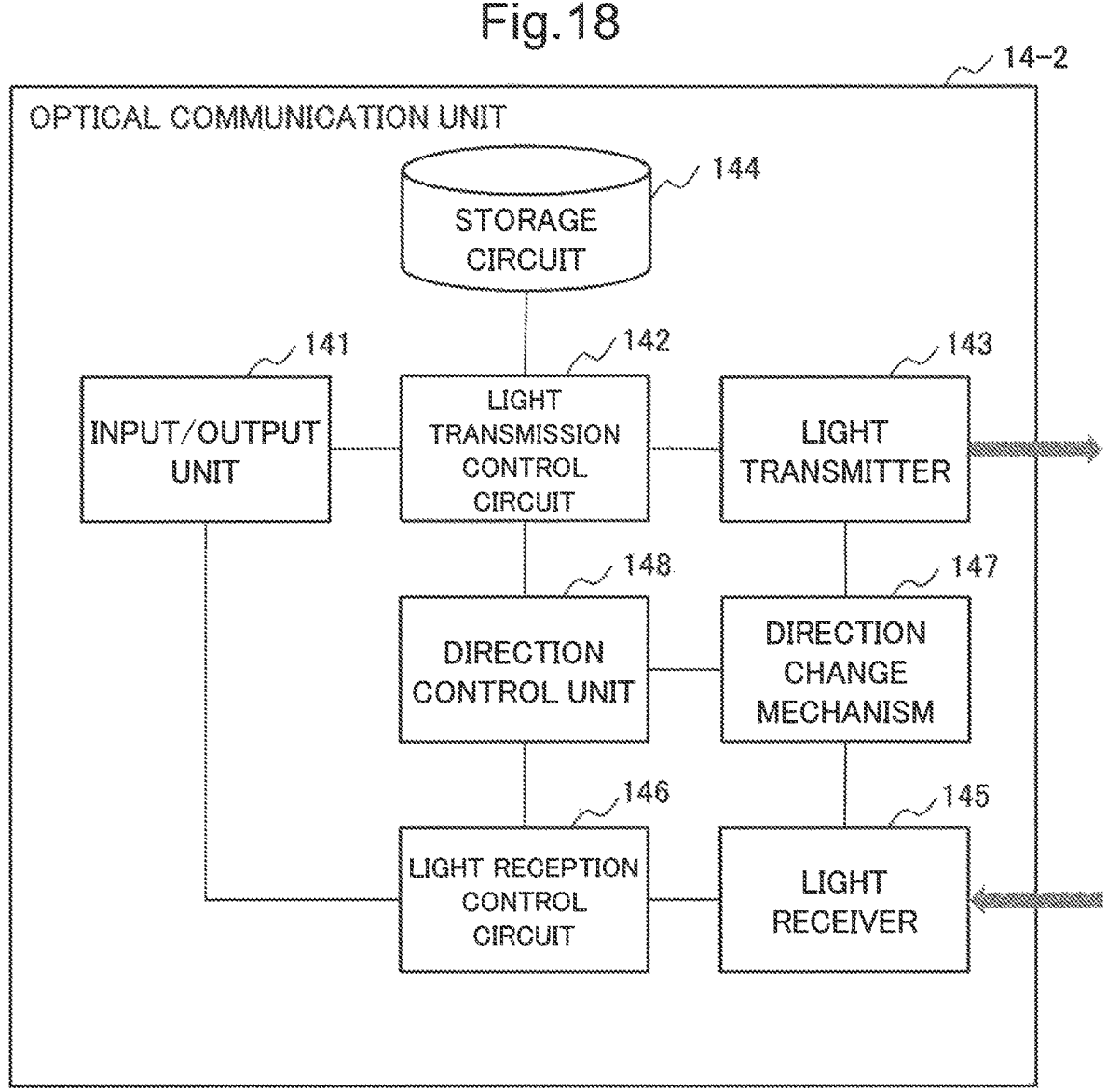
FIG. 18 is a block diagram of an optical communication unit of a communication device according to a second example embodiment of the present invention.

FIG. 18 is a block diagram illustrating a configuration of an optical communication unit 14-2 according to the present example embodiment. As in FIG. 18, the optical communication unit 14-2 has a configuration obtained by adding a direction change mechanism 147 and a direction control unit 148 to the optical communication unit 14 according to the first example embodiment. In the following, the direction change mechanism 147 and the direction control unit 148 are described, and description about other configurations is omitted. Note that a function of changing a transmission direction and a reception direction of communication light 100 can be also added to the optical communication unit 24 of the communication device 2, by making a configuration similar to that of the optical communication unit 14-2.

The direction change mechanism 147 is a mechanism that changes a transmission direction and a reception direction of the communication light 100. The direction change mechanism may be a mechanically operating mechanism, or may be a mechanism that does not include a mechanically operating part. The direction change mechanism 147 may change a light direction and a reception direction of the communication light 100 cooperatively, or may operate independently.

The direction control unit 148 controls the direction change mechanism 147 in accordance with control of a light transmission control circuit 142 or a light reception control circuit 146. Thus, in the present example embodiment, it is preferable to add a function of setting a transmission and reception direction of the communication light 100 to the light transmission control circuit 142 or the light reception control circuit 146.

Figure 19:
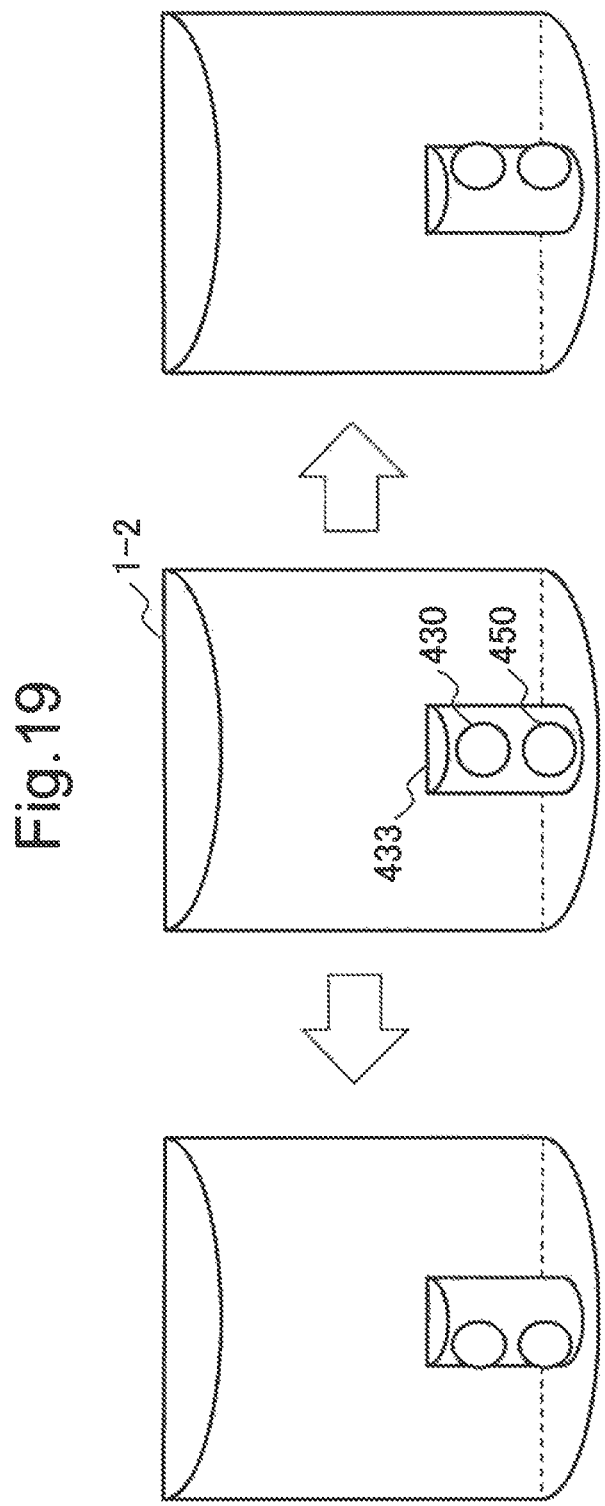
FIG. 19 is a conceptual view relating to an operation example of a movable unit of the communication device according to the second example embodiment of the present invention.

FIG. 19 is one example of an appearance of a communication device 1-2 according to the present example embodiment. The communication device 1-2 includes a mechanically operating movable unit 433 (also referred to as a movable means). In the movable unit 433, a light transmission window 430 for transmitting the communication light 100 and a light reception window 450 for receiving the communication light are disposed. For example, the movable unit 433 may arrange the light transmission window 430 and the light reception window 450 on a side face of a columnar support, may form a pair of shafts on opposite positions of upper and lower faces, and may secure the both shafts to a body in a rotatable manner. The movable unit 433 may be configured to rotate relative to the body, by using a drive mechanism such as a motor. With this configuration, a direction of the light transmission window 430 and the light reception window 450 is changeable by rotating the movable unit 433 relative to the body.

A center view in FIG. 19 illustrates a state of the front-facing movable unit 433. A left view in FIG. 19 is an example in which a light transmission and reception direction is directed to a leftward direction when the movable unit 433 is viewed from the front. A right view in FIG. 19 is an example in which a light transmission and reception direction is directed to a rightward direction when the movable unit 433 is viewed from the front.

With the configuration as in FIG. 19, a light transmission and reception direction of the communication terminal 200 is able to be controlled. Incidentally, the light transmission window 430 and the light reception window 450 may not be integrated, and may be configured in such a way as to operate independently of each other. Further, the movable unit 433 in which the light transmission window 430 and the light reception window 450 are disposed may be configured in such a way as to not only rotate horizontally, but also rotate vertically or diagonally.

Application Example

Figure 20:
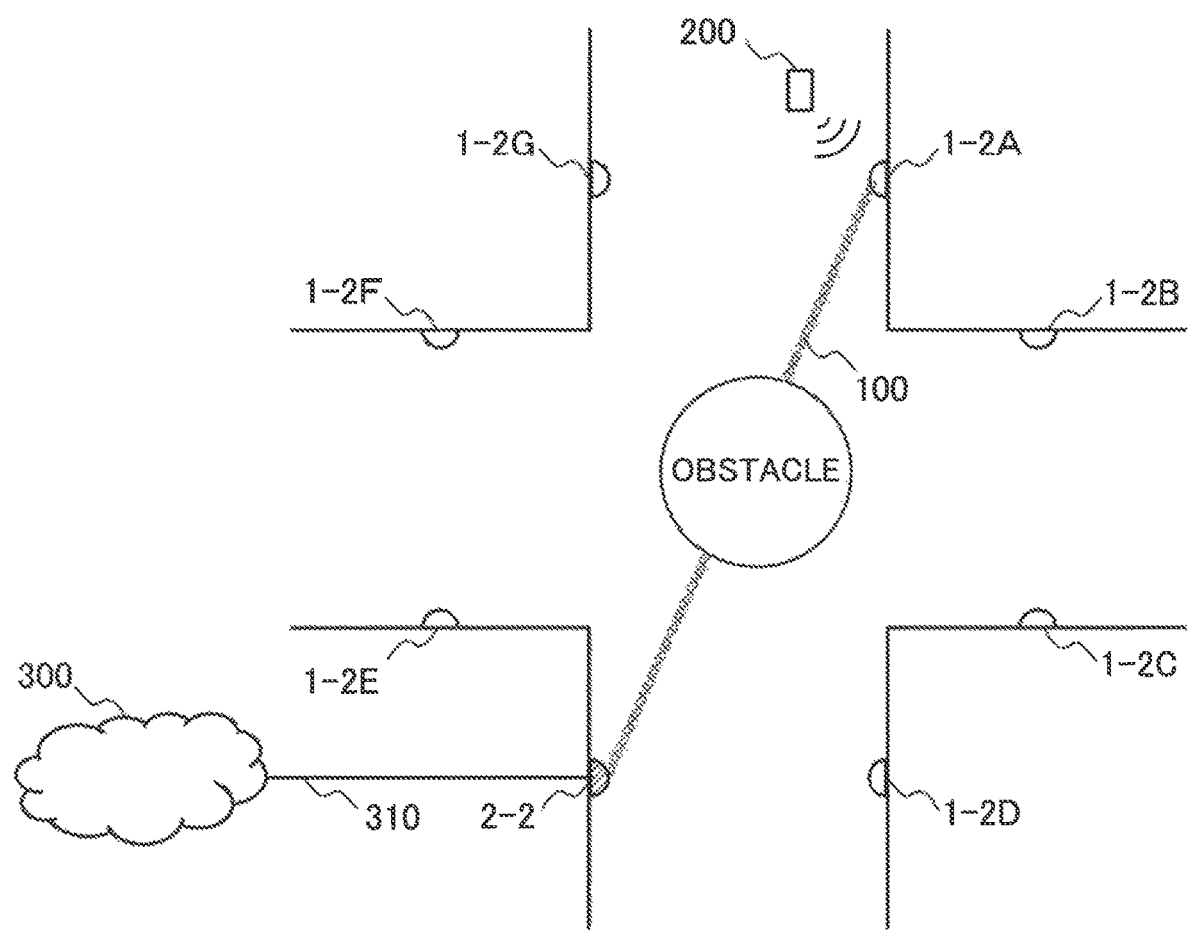
FIG. 20 is a conceptual view of a communication example in a communication system according to the second example embodiment of the present invention.
Figure 21:
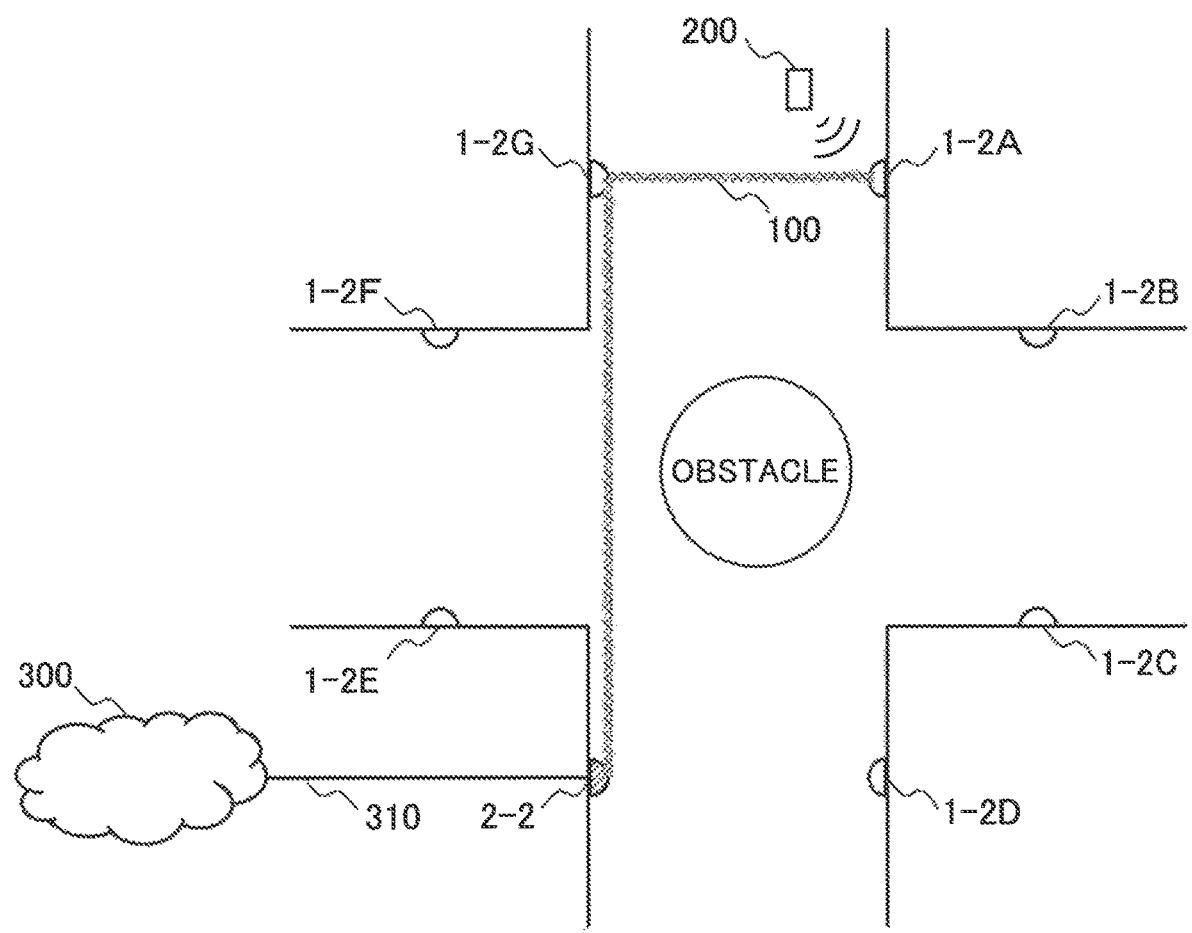
FIG. 21 is a conceptual view of a communication example in the communication system according to the second example embodiment of the present invention.

Herein, an application example of transmission and reception of the communication light 100 in a wireless LAN configured by the communication device 1-2 having a relay function and a communication device 2-2 having a router function is described by using FIGS. 20 and 21. FIGS. 20 and 21 are conceptual views seen from a viewpoint similar to that in FIGS. 14 to 17. Note that it is assumed that the communication device 2-2 includes the optical communication unit 14-2 according to the present example embodiment.

As illustrated in FIG. 20, the seven communication devices 1-2 having a relay function and the communication device 2-2 having a router function are installed near a crossroad. The seven communication devices 1-2 include a communication device 1-2A, a communication device 1-2B, a communication device 1-2C, a communication device 1-2D, a communication device 1-2E, a communication device 1-2F, and a communication device 1-2G.

In an example in FIG. 20, a scene is illustrated in which an obstacle is located between the communication device 1-2A and the communication device 2-2, and the communication light 100 cannot be transmitted and received directly.

In a situation as in FIG. 20, a relay control unit 13 of the communication device 1-2 detects the presence of an obstacle on a transmission and reception path of the communication light 100, and performs control in such a way as to change a communication route of the communication light 100. For example, the relay control unit 13 of the communication device 1-2 determines the presence or absence of a failure according to the presence or absence of response light from the communication device 2-2. In other words, the relay control unit 13 of the communication device 1-2 detects the presence of an obstacle on a transmission and reception path of the communication light 100 according to interruption of optical communication with the communication device 2-2.

For example, when the relay control unit 13 outputs, to the optical communication unit 14-2, an instruction signal for changing a communication route of the communication light 100, the light transmission control circuit 142 or the light reception control circuit 146 controls the direction control unit 148 and actuates the direction change mechanism 147. In this control, a transmission and reception direction of the communication light 100 is changed by movement of the movable unit 433 as in FIG. 19.

FIG. 21 is an example in which the communication light 100 is transmitted and received between the communication device 1-2A and the communication device 2-2 via the communication device 1-2G. As in FIG. 21, the present example embodiment is able to transmit and receive the communication light 100 between the communication device 1-2 and the communication device 2-2, even when an obstacle is located between the communication device 1-2 and the communication device 2-2. As a result, a connection between the communication terminal 200 and the backbone network 300 is established.

As described above, the communication device according to the present example embodiment is able to change a transmission and reception direction of the communication light 100, and thus, even when communication light cannot be transmitted and received directly between a repeater and a router, a connection between a communication terminal and a backbone network is able to be established via another repeater. In other words, the present example embodiment is able to enhance stability in a wireless LAN.

Further, when a communication terminal or a wireless device that is not a communication target is located on a path of communication light, the communication device according to the present example embodiment is able to reduce risk of interception of a communication content, by changing the path of the communication light. In other words, the communication device according to the present example embodiment is able to enhance security of communication in a wireless LAN.

Incidentally, when using a light source that is unable to control a direction of communication light, it is necessary to perform strict alignment in a step of installing a communication device, in order to transmit and receive communication light between communication devices. Since alignment between communication devices needs to be performed for all the devices, cumbersome work is required. On the other hand, the communication device according to the present example embodiment is able to mechanically change a transmission direction of communication light, and thus, alignment between communication devices is executable accurately and simply.

Third Example Embodiment

Next, a communication device according to a third example embodiment of the present invention is described with reference to the drawings. The communication device according to the present example embodiment includes a spatial light modulation device in a light transmitter. Note that the communication device according to the present example embodiment has a configuration similar to that of the first example embodiment except for the light transmitter, and thus, detailed description about the similar configuration is omitted.

Figure 22:
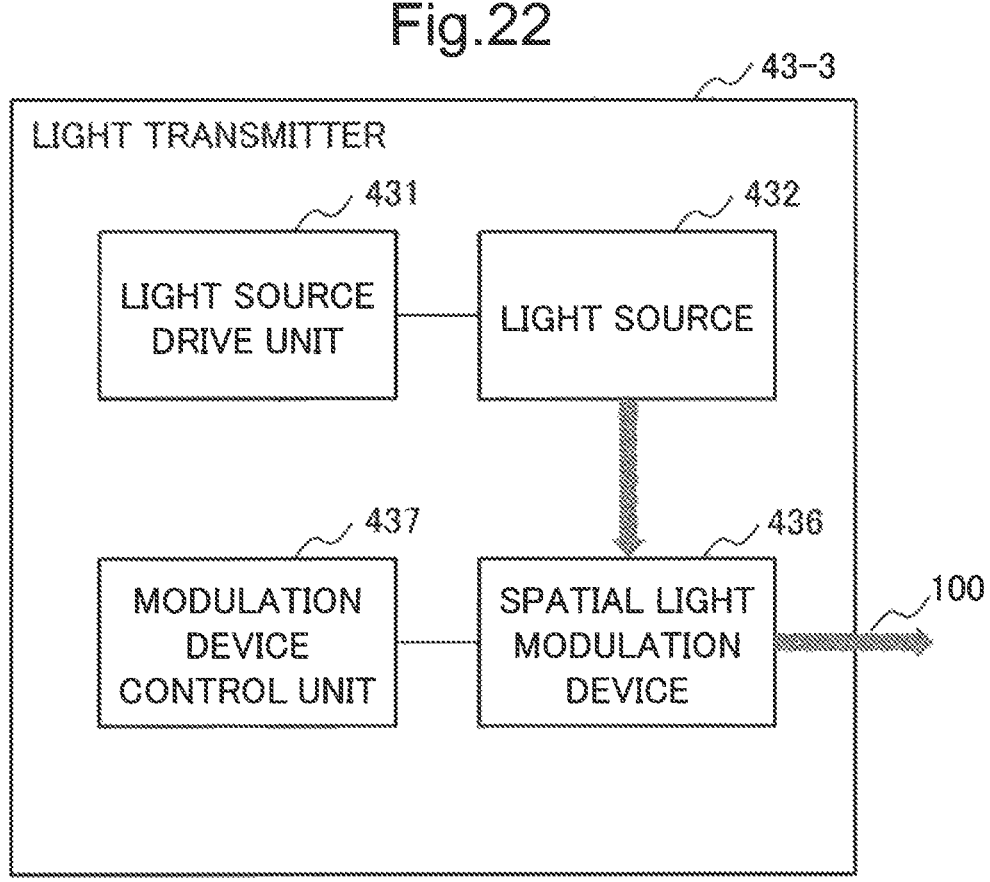
FIG. 22 is a block diagram of a light transmitter included in an optical communication unit of a communication device according to a third example embodiment of the present invention.

FIG. 22 illustrates a configuration of a light transmitter 43-3 according to the present example embodiment. As illustrated in FIG. 22, the light transmitter 43-3 includes a spatial light modulation device 436 and a modulation device control unit 437 (also referred to as a modulation device control means). The light transmitter 43-3 irradiates a display unit (also referred to as a display means) of the spatial light modulation device 436 with emission light of a light source 432, and transmits reflected light from the display unit as communication light 100.

The spatial light modulation device 436 displays, on the own display unit, a pattern equivalent to the communication light 100 to be transmitted, according to control of the modulation device control unit 437. In the present example embodiment, while a predetermined pattern is displayed on the display unit of the spatial light modulation device 436, the display unit is irradiated with parallel light from the light source 432. The spatial light modulation device 436 reflects modulated light of the irradiated parallel light.

The spatial light modulation device 436 has a matrix circuit in which a pixel is formed, by using an electrode such as aluminum, on an uppermost layer of an address circuit formed on a substrate such as a silicon substrate, and in which a potential of each pixel is independently controllable. Further, the spatial light modulation device 436 has a configuration in which a liquid crystal material is interposed between the matrix circuit and a transparent substrate such as glass on which a transparent electrode is disposed. When voltage of each pixel in the matrix circuit is independently controlled, a difference in a refractive index is generated due to a change in a state of a liquid crystal molecule on each pixel, and a phase of incident light is able to be changed.

The spatial light modulation device 436 is able to be implemented by a phase modulation type spatial light modulation device that receives incidence of in-phase coherent parallel light and modulates a phase of the incident parallel light. For the light source 432, a light source emitting laser light is preferably used. The phase modulation type spatial light modulation device 436 is focus free, and thus, even when light is projected at a plurality of projection distances, it is unnecessary to change a focus for each distance. Note that, the spatial light modulation device 436 may be a device of a scheme different from a phase modulation type, but, in the following, description is given assuming a phase modulation type device.

The spatial light modulation device 436 is implemented by a device using, for example, a ferroelectric liquid crystal, a homogeneous liquid crystal, or a vertical alignment liquid crystal. Specifically, the spatial light modulation device 436 may be implemented by a liquid crystal on silicon (LCOS). Further, the spatial light modulation device 436 may be implemented by, for example, a micro electro mechanical system (MEMS).

Use of the phase modulation type spatial light modulation device 436 enables concentration of energy on a portion of display information, by operating the spatial light modulation device 436 in such a manner as to sequentially switch an area for transmitting communication light. Thus, for equal output of the light source 432, the phase modulation type spatial light modulation device 436 enables brighter display of display information than in a scheme of projecting light on an entire display area.

Figure 23:
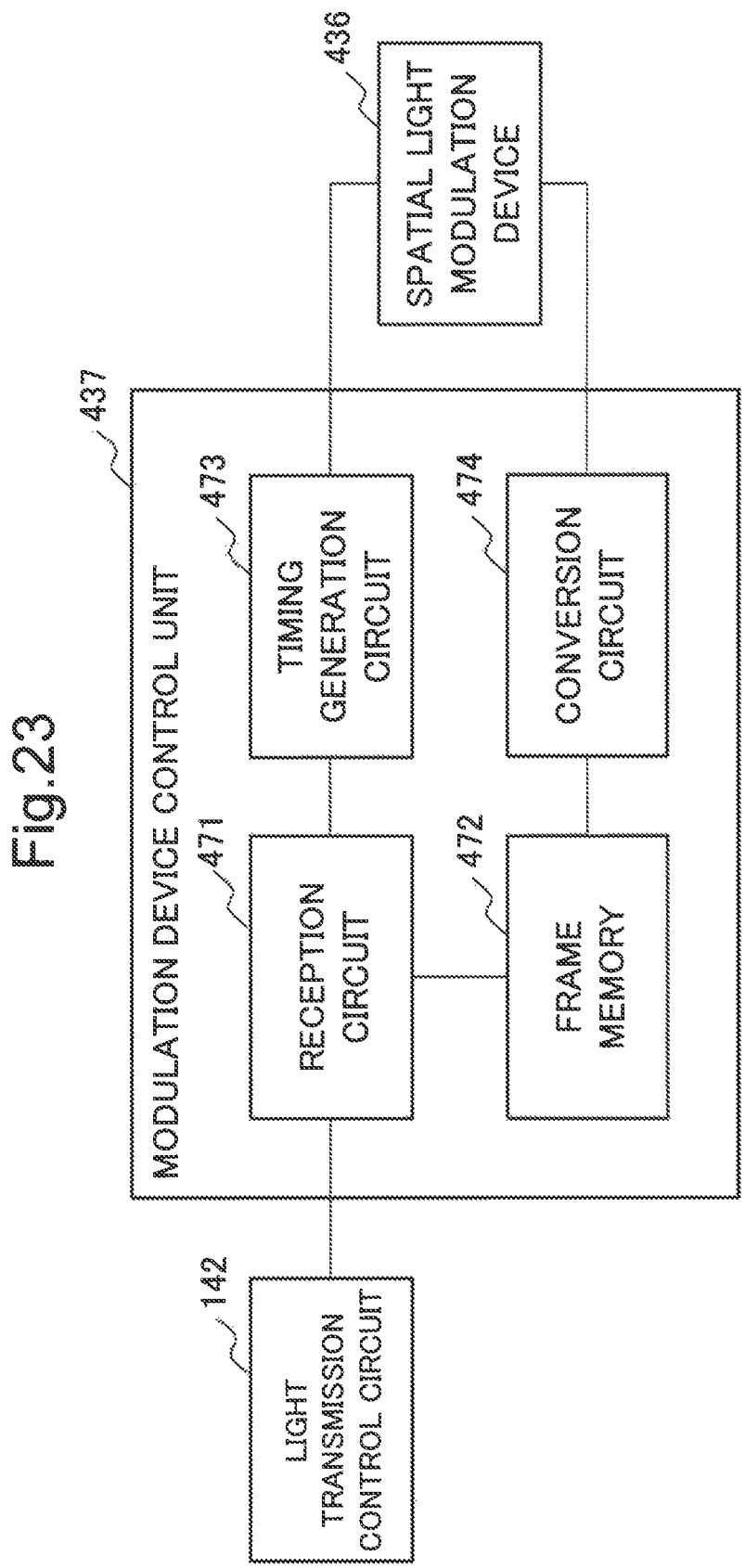
FIG. 23 is a block diagram illustrating a configuration of a modulation device drive unit of the light transmitter included in the optical communication unit of the communication device according to the third example embodiment of the present invention.

The modulation device control unit 437 is described in detail by using FIG. 23. As illustrated in FIG. 23, the modulation device control unit 437 includes a reception circuit 471, a frame memory 472, a timing generation circuit 473, and a conversion circuit 474.

The reception circuit 471 acquires, from a light transmission control circuit 142, a pattern to be displayed on the display unit of the spatial light modulation device 436. In the case of the phase modulation type spatial light modulation device 436, a pattern to be displayed on the display unit is a phase distribution corresponding to the communication light 100. For example, the reception circuit 471 receives a phase distribution as a digital visual interface (DVI) signal. The reception circuit 471 stores an acquired phase image in the frame memory 472. Note that a phase distribution to be displayed on the display unit of the spatial light modulation device 436 may be stored in a storage circuit 144 of an optical communication unit 14.

The frame memory 472 stores a phase distribution to be displayed on the display unit of the spatial light modulation device 436. Further, the frame memory 472 outputs a phase distribution in response to a timing of conversion processing of the conversion circuit 474.

The timing generation circuit 473 generates a timing of acquiring a phase distribution, or converting a phase distribution stored in the frame memory 472 from a digital signal to an analog signal.

The conversion circuit 474 reads a phase distribution from the frame memory 472, on the basis of a timing generated by the timing generation circuit 473. The conversion circuit 474 converts the read phase distribution into an analog signal, and outputs the analog signal to the spatial light modulation device 436.

The light transmission control circuit 142 performs control such that communication light having an arbitrary shape or a magnitude is transmitted toward an arbitrary communication target, by matching a timing for displaying a phase distribution on the display unit of the spatial light modulation device 436, with a timing for emitting light by driving the light source 432.

Figure 24:
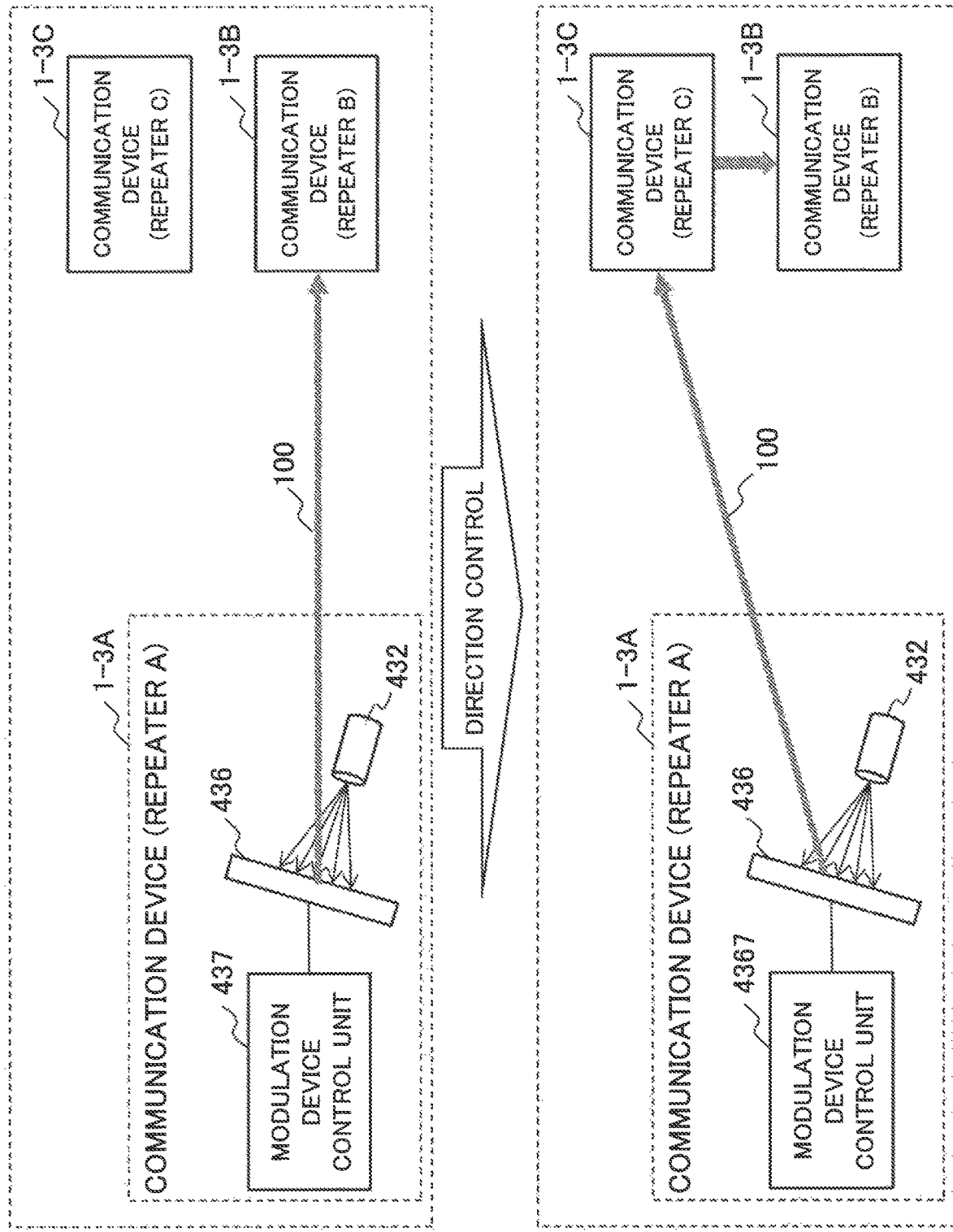
FIG. 24 is a conceptual view illustrating one example of direction control of the communication device according to the third example embodiment of the present invention.

FIG. 24 is a conceptual view illustrating one example of controlling a transmission direction of the communication light 100 transmitted by a communication device 1-3 according to the present example embodiment. Note that no optical system is arranged on a subsequent stage of the spatial light modulation device 436 in FIG. 24, but an optical system such as a Fourier transform lens or a projection lens may be arranged.

As illustrated in an upper view in FIG. 24, in a communication device 1-3A (hereinafter, a repeater A), the display unit of the spatial light modulation device 436 displays a phase distribution according to control of the modulation device control unit 437, and the display unit is irradiated with laser light from the light source 432.

In the present example embodiment, the display unit of the spatial light modulation device 436 may display a phase distribution for forming a spot at a light receiving position of a communication device 1-3B (hereinafter, a repeater B) that is a communication target. Note that use of the spatial light modulation device 436 also allows transmission of the communication light 100 of an arbitrary shape, by preparing a phase distribution to be displayed on the display unit. Use of a light receiver 145 including a plurality of light receiving regions arranged in an array and having an image capturing function also allows a projection shape of the communication light 100 to include information. Further, transmitting and receiving only the communication light 100 of a particular shape also leads to enhancing security between communication devices.

In the communication device 1-3 according to the present example embodiment, a transmission direction of the communication light 100 is changed by changing a phase distribution to be displayed on the display unit of the spatial light modulation device 436. In other words, in the communication device 1-33 according to the present example embodiment, a transmission direction of the communication light 100 is able to be changed without providing a mechanically operating movable unit.

For example, as in a lower view in FIG. 24, configuration may be made also such that reflected light of the spatial light modulation device 436 of the repeater A is transmitted, as the communication light 100, to a communication device 1-3C (hereinafter, a repeater C) and the communication light 100 is transmitted to the repeater B through the repeater C. In other words, even when the communication light 100 cannot be transmitted and received directly between the repeater A and the repeater B, a connection can be formed between the repeater A and the repeater B through the repeater C.

As described above, the communication device according to the present example embodiment is able to control a transmission direction of communication light in an arbitrary direction without a mechanical operation unit, by transmitting the communication light by using a spatial light modulation device.

When using a light source that is unable to control a direction of communication light, it is necessary to perform strict alignment in a step of installing a communication device. The communication device according to the present example embodiment is able to execute alignment between communication devices more accurately and more simply, by changing setting of software, without need for performing mechanical adjustment.

Fourth Example Embodiment

Next, a communication device according to a fourth example embodiment of the present invention is described with reference to the drawings. The communication device according to the present example embodiment includes a spatial light modulation device disposed on a subsequent stage of an optical communication unit. Note that the communication device according to the present example embodiment has a configuration similar to that of the first example embodiment except for the spatial light modulation device and a modulation device control unit, and thus, detailed description about the similar configuration is omitted.

Figure 25:
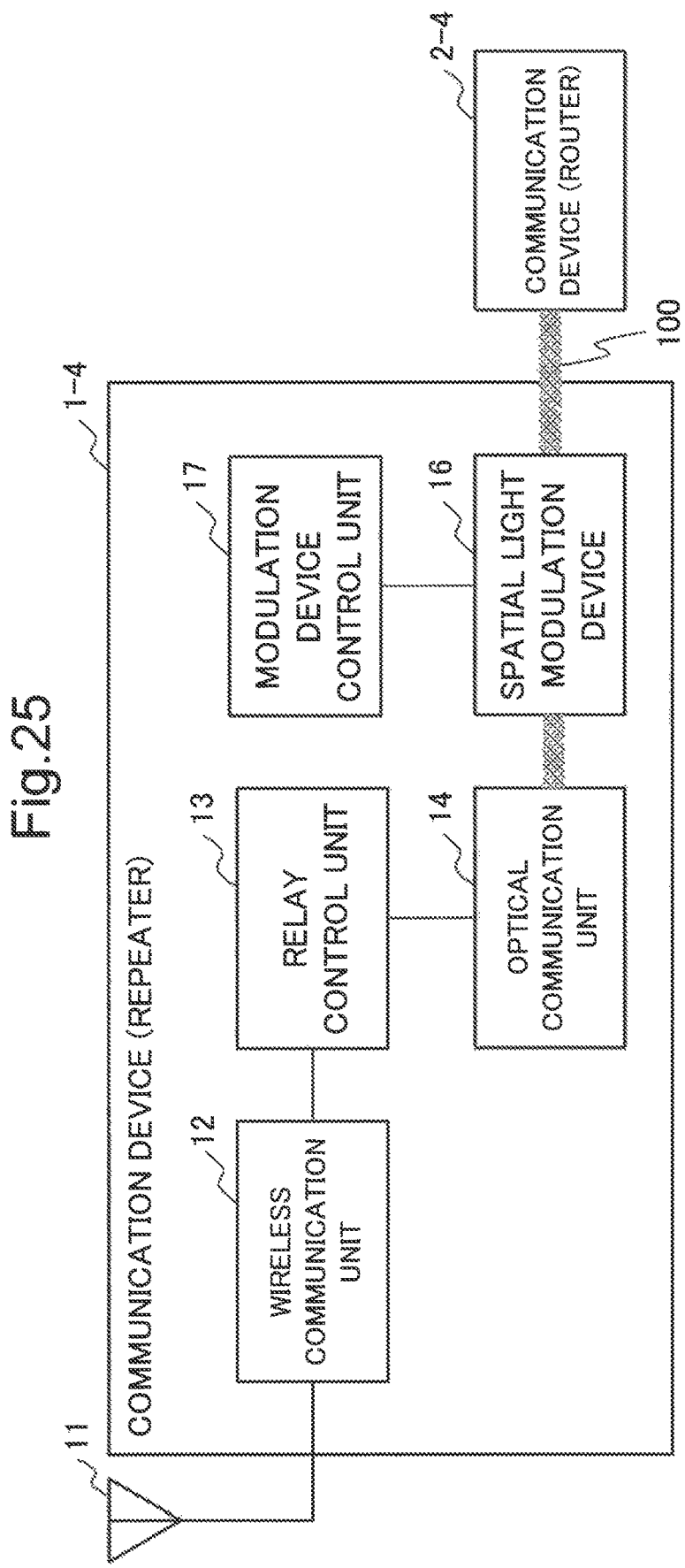
FIG. 25 is a block diagram of a communication device (repeater) according to a fourth example embodiment of the present invention.

FIG. 25 is a block diagram illustrating a configuration of a communication device 1-4 (repeater) according to the present example embodiment. As in FIG. 25, the communication device 1-4 is different from the communication device 1 (repeater) according to the first example embodiment in including a spatial light modulation device 16 and a modulation device control unit 17.

Further, FIG. 26 is a block diagram illustrating a configuration of a communication device 2-4 (router) according to the present example embodiment. As in FIG. 26, the communication device 2-4 is different from the communication device 2 (router) according to the first example embodiment in including a spatial light modulation device 26 and a modulation device control unit 27.

Note that configurations of the spatial light modulation device 16 and the modulation device control unit 17 of the communication device 1-4 are similar to configurations of the spatial light modulation device 26 and the modulation device control unit 27 of the communication device 2-4. Thus, in the following, the spatial light modulation device 16 and the modulation device control unit 17 of the communication device 1-4 are described.

FIG. 27 is a diagram conceptualizing that light emitted from a light transmitter 143 of an optical communication unit 14 is guided to the spatial light modulation device 16 and transmitted as communication light 100, and that the communication light 100 received by the spatial light modulation device 16 is guided to a light receiver 145.

A communication device (hereinafter, referred to as the communication device 1-4) communicating with a particular communication target by using the communication light 100 controls a transmission direction of the communication light 100 according to a pattern displayed on a display unit of the spatial light modulation device 16. The communication target transmits the communication light 100 to the communication device 1-4. The communication device 1-4 conveys information according to driving timing of the communication light 100. Thus, unless a position of the communication target changes, the communication light 100 that the spatial light modulation device 16 receives continues to be received by the light receiver 145.

FIGS. 28 and 29 are conceptual views each illustrating an application example of the communication device 1-4 according to the present example embodiment. The example in FIG. 28 indicates a control example when a communication device 1-4A (hereinafter, a repeater A) communicates with a communication device 1-4B (hereinafter, a repeater B) by using the communication light 100 and an obstacle gets into a communication path of the communication light 100. Note that, in the examples in FIGS. 28 and 29, the repeater B, a repeater C, and a repeater D are all connected to the communication device 2-4 (router).

As in an upper view (scene A) in FIG. 28, an obstacle is located between the repeater A and the repeater B. In the scene A, the repeater A and the repeater B are unable to directly communicate with each other by using the communication light 100.

At this time, the repeater A changes a pattern of the display unit of the spatial light modulation device 16, and transmits (wide scan) the communication light 100 requesting a response, toward a wide range as in a lower view (scene B) in FIG. 28. In the scene B, the communication light 100 does not reach a communication device 1-4C (hereinafter, the repeater C) due to the obstacle, but the communication light 100 reaches a communication device 1-4D (hereinafter, the repeater D).

An upper view (scene C) in FIG. 29 is an example in which the repeater D transmits the communication light 100 indicating a response, in response to a wide scan of the repeater A. In the scene C, the communication light 100 from the repeater D is received by the optical communication unit 14.

A lower view (scene D) in FIG. 29 is an example in which the repeater A transmits the communication light 100 toward the repeater D, in response to a response from the repeater D. After the scene D, communication is possible between the repeater A and the repeater D by using the communication light 100.

As described above, the communication device according to the present example embodiment not only uses a spatial light modulation device only in order to transmit communication light, but also uses the spatial light modulation device in order to receive communication light. Use of a spatial light modulation device allows control of a transmission and reception direction of communication light, by only changing a pattern to be displayed on a display unit.

Further, use of a spatial light modulation device allows selective reception of desired communication light, by controlling a display pattern of a display unit of a spatial light modulation device. Thus, the communication device according to the present example embodiment also makes it possible to select communication light to be received.

Fifth Example Embodiment

Next, a fifth example embodiment of the present invention is described with reference to the drawings. The present example embodiment is different from the first to fourth example embodiments in including an optical communication unit in a terminal device communicating with a communication device, and in communicating also between a communication device and a communication terminal by using communication light. A communication terminal according to the present example embodiment may be applied to any of the first to fourth example embodiments, but, in the following, an example of communicating with the communication device 1 according to the first example embodiment is described.

FIG. 30 is a block diagram illustrating a configuration of a communication terminal 250 according to the present example embodiment. As illustrated in FIG. 30, the communication terminal 250 according to the present example embodiment includes an antenna 251, a wireless communication unit 252, a communication control unit 253, a terminal control unit 254, a storage circuit 255, and an optical communication unit 257. Note that the configuration in FIG. 30 is one example, and is not intended to limit the scope of the present invention.

The antenna 251, the wireless communication unit 252, the communication control unit 253, the terminal control unit 254, and the storage circuit 255 have configurations similar to those of the communication terminal 200 in FIG. 13. Further, the optical communication unit 257 has a configuration and a function similar to those of any of the optical communication units according to the first to fourth example embodiments.

FIG. 31 is a conceptual view illustrating an application example of the communication terminal 250. In the example in FIG. 12, the communication terminal 200 communicates with the communication device 1 by using a wireless signal. In contrast, in the example in FIG. 31, the communication terminal 250 communicates with the communication device 1 by using communication light 100. When an obstacle is present between the communication terminal 250 and the communication device 1, a communication environment cannot be constructed between those devices. However, by controlling a direction of the communication light 100 as in the second to fourth example embodiments, the communication terminal 250 is able to construct a connection environment with a backbone network 300, when being connected with a communication device 2 by relaying through any of the communication devices 1. Note that a user himself/herself who uses the communication terminal 250 may change a transmission direction of the communication light 100.

As described above, the communication terminal according to the present example embodiment communicates with a communication device by using communication light. Thus, the communication terminal according to the present example embodiment is able to construct a connection environment with a backbone network without using a communication band of a wireless signal.

Further, the communication terminal according to the present example embodiment also performs information conveyance between a communication terminal and a communication device by using communication light, and thus, is able to reduce a possibility of interception of a communication content in comparison with when using a wireless signal. In other words, the communication device according to the present example embodiment is able to further enhance security of communication in a wireless LAN.

Each of the example embodiments described above is a preferred example embodiment of the present invention. The present invention is not limited to the example embodiments, and is able to be carried out by making various modifications on the basis of a technical idea of the present invention. For example, each of the example embodiments described above indicates, for simplicity of description, an example in which one communication device having a router function and a plurality of communication devices having a relay function configure a wireless LAN. The number, positions, and configurations of communication terminals are not limited to the above-described example, and can be arbitrarily modified.

Further, in each of the example embodiments described above, a communication device having a router function and a communication device having a relay function are separate devices, but are not limited to this configuration, as long as being able to implement a function as each of the example embodiments described above. For example, configuration may be made in such a manner that a wireless signal can be transmitted and received between respective communication devices.

In the above, the present invention has been described with reference to the example embodiments. However, the present invention is not limited to the above-described example embodiments. Various modifications that are be understandable by a person skilled in the art are able to be made to the configurations and details of the present invention within the scope of the present invention.

[Supplementary Notes]

A part or all of the example embodiments described above may be described as the following supplementary notes, but are not limited to the following.

(Supplementary Note 1)

A communication apparatus including:

a wireless communication means for transmitting and receiving a wireless signal;

an optical communication means for transmitting and receiving spatial light as communication light; and a control means for performing signal conversion in a process for converting the wireless signal and the communication light and, the control means for setting a transmission destination of the wireless signal and the communication light.

(Supplementary Note 2)

The communication apparatus according to Supplementary note 1, wherein the optical communication means includes:

a light transmitter that transmits the communication light, based on the wireless signal; and a light receiver that receives the communication light transmitted from another apparatus.

(Supplementary Note 3)

The communication apparatus according to Supplementary note 2, wherein the light transmitter includes a light source that emits laser light.

(Supplementary Note 4)

The communication apparatus according to Supplementary note 3, wherein the light transmitter includes:

a phase modulation type spatial light modulator that includes a display means for reflecting emission light of the light source; and a modulator control means for controlling a pattern to be displayed on the display means of the spatial light modulator, and the emission light from the light source is reflected by the display means of the spatial light modulator and transmitted as the communication light.

(Supplementary Note 5)

The communication apparatus according to Supplementary note 3, further including:

a phase modulation type spatial light modulator that includes a display means for reflecting emission light of the light source; and a modulator control means for controlling a pattern to be displayed on the display means of the spatial light modulator, wherein the spatial light modulator transmits, as the communication light, the emission light from the light transmitter by reflecting the emission light by the display means, and causes the display means to reflect the communication light transmitted from another apparatus and the light receiver to receive the reflected communication light.

(Supplementary Note 6)

The communication apparatus according to Supplementary note 4 or 5, wherein the modulator control means controls a transmission direction of the communication light by changing a pattern to be displayed on the display means of the spatial light modulator.

(Supplementary Note 7)

The communication apparatus according to Supplementary note 6, wherein the optical communication means expands, upon interruption of optical communication with a communication target, an irradiation range of the communication light by changing the pattern of the display means of the spatial light modulator, and transmits the communication light toward another apparatus responding to the communication light of which the irradiation range is expanded.

(Supplementary Note 8)

The communication apparatus according to any one of Supplementary notes 2 to 7, wherein the optical communication means includes:

a movable means for changing a direction of the light transmitter and the light receiver; and a direction control means for controlling the movable means in order to control the direction of the light transmitter and the light receiver.

(Supplementary Note 9)

The communication apparatus according to any one of Supplementary notes 1 to 8, further including a backbone connection means having a router function for connecting with a backbone network, wherein the control means establishes connection between the backbone network and a communication terminal that transmits and receives the wireless signal to and from the wireless communication means.

(Supplementary Note 10)

A communication terminal having a wireless communication function of transmitting and receiving the wireless signal to and from the communication apparatus according to any one of Supplementary notes 1 to 9.

(Supplementary Note 11)

A communication terminal having an optical communication function of transmitting and receiving the communication light to and from the communication apparatus according to any one of Supplementary notes 1 to 9.

(Supplementary Note 12)

A wireless communication system including a plurality of the communication apparatuses according to any one of Supplementary notes 1 to 9, wherein the plurality of the communication apparatuses are arranged in such a manner as to transmit and receive the communication light to and from each other.

(Supplementary Note 13)

A communication method including:

arranging a plurality of communication apparatuses each including a wireless communication means for transmitting and receiving a wireless signal, an optical communication means for transmitting and receiving spatial light as communication light, and a control means for performing signal conversion in a process for converting the wireless signal and the communication light and setting a transmission destination of the wireless signal and the communication light; and performing control in such a manner that the different communication apparatuses communicate with each other by using the communication light.

This application is based upon and claims the benefit of priority from Japanese Patent Application No. 2016-65877, filed on Mar. 29, 2016, the disclosure of which is incorporated herein in its entirety by reference.

REFERENCE SIGNS LIST 1, 2 Communication device
11 Antenna
12 Wireless communication unit
13 Relay control unit
14 Optical communication unit
16 Spatial light modulation device
17 Modulation device control unit
22 Wireless communication unit
23 Router control unit
24 Optical communication unit
25 Backbone connection unit
26 Spatial light modulation device
27 Modulation device control unit
131 Signal conversion unit
132 Light transmission condition generation unit
133 Input/output unit
134 Relay control circuit
135 Storage unit
141 Input/output unit
142 Light transmission control circuit
143 Light transmitter
144 Storage circuit
145 Light receiver
146 Light reception control circuit
147 Direction change mechanism
148 Direction control unit
200 Communication terminal
231 Signal conversion unit
232 Light transmission condition generation unit
233 Input/output unit
234 Router control circuit
235 Storage unit
251 Antenna
252 Wireless communication unit
253 Communication control unit
254 Terminal control unit
255 Storage circuit
257 Optical communication unit
300 Backbone network
310 Wireline cable
431 Light source drive unit
432 Light source
436 Spatial light modulation device
437 Modulation device control unit

What is claimed is:

1. A communication apparatus comprising:
 a wireless communicator configured to transmit and receive a wireless signal;
 an optical communicator configured to transmit and receive spatial light as communication light; and
 a controller configured to perform signal conversion in a process for converting the
 wireless signal and the communication light and, the controller is configured to set a transmission destination of the wireless signal and the communication light, wherein
 the optical communicator expands, upon interruption of communication with a communication target, an irradiation range of the communication light, and transmits the communication light toward another apparatus responding to the communication light of which the irradiation range is expanded.

2. The communication apparatus according to claim 1, wherein the optical communicator includes:
 a light transmitter that transmits the communication light, based on the wireless signal; and
 a light receiver that receives the communication light transmitted from another apparatus.

3. The communication apparatus according to claim 2, wherein the light transmitter includes a light source that emits laser light.

4. The communication apparatus according to claim 3, wherein the light transmitter includes:
 a phase modulation type spatial light modulator that includes a display configured to reflect emission light of the light source; and
 a modulator controller configured to control a pattern to be displayed on the display means of the spatial light modulator, and
 the emission light from the light source is reflected by the display means of the spatial light modulator and transmitted as the communication light.

5. The communication apparatus according to claim 3, further comprising:
 a phase modulation type spatial light modulator that includes a display configured to reflect emission light of the light source; and
 a modulator controller configured to control a pattern to be displayed on the display means of the spatial light modulator, wherein
 the spatial light modulator transmits, as the communication light, the emission light from the light transmitter by reflecting the emission light by the display, and causes the display to reflect the communication light transmitted from another apparatus and the light receiver to receive reflected communication light.

6. The communication apparatus according to claim 4, wherein
the modulator controller controls a transmission direction of the communication light by changing a pattern to be displayed on the display of the spatial light modulator.

7. The communication apparatus according to claim 2, wherein the optical communicator includes:
a movable part configured to change a direction of the light transmitter and the light receiver; and
a direction controller configured to control the movable part in order to control the direction of the light transmitter and the light receiver.

8. The communication apparatus according to claim 1, further comprising a backbone connection device having a router function for connecting with a backbone network, wherein
the controller establishes connection between the backbone network and a communication terminal that transmits and receives the wireless signal to and from the wireless communicator.

9. A communication terminal having a wireless communication function of transmitting and receiving the wireless signal to and from the communication apparatus according to claim 1.

10. A communication terminal having an optical communication function of transmitting and receiving the communication light to and from the communication apparatus according to claim 1.

11. A wireless communication system comprising a plurality of the communication apparatuses according to claim 1, wherein
the plurality of the communication apparatuses are arranged in such a manner as to transmit and receive the communication light to and from each other.

12. A communication method comprising:
arranging a plurality of communication apparatuses each including a wireless communicator configured to transmit and receive a wireless signal, an optical communicator configured to transmit and receive spatial light as communication light, and a controller configured to perform signal conversion in a process for converting the wireless signal and the communication light and, the controller configured to set a transmission destination of the wireless signal and the communication light; and
performing control in such a manner that the different communication apparatuses communicate with each other by using the communication light, wherein
expanding, upon interruption of communication with a communication target, an irradiation range of the communication light, and transmits the communications light toward another apparatus responding to the communication light of which the irradiation range is expanded.

13. A communication apparatus comprising:
a wireless communication means for transmitting and receiving a wireless signal;
an optical communication means for transmitting and receiving spatial light as communication light; and
a control means for performing signal conversion in a process for converting the wireless signal and the communication light and, the control means for setting a transmission destination of the wireless signal and the communication light, wherein
the optical communication means expands, upon interruption of communication with a communication target, an irradiation range of the communication light, and transmits the communication light toward another apparatus responding to the communication light of which the irridation range is expanded.

\* \* \* \* \*